(12) United States Patent
Kawasaki

(10) Patent No.: US 12,315,191 B2
(45) Date of Patent: May 27, 2025

(54) ABSOLUTE SCALE DEPTH CALCULATION DEVICE, ABSOLUTE SCALE DEPTH CALCULATION METHOD, AND COMPUTER PROGRAM PRODUCT

(71) Applicant: KABUSHIKI KAISHA TOSHIBA, Tokyo (JP)

(72) Inventor: Atsushi Kawasaki, Ota (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 379 days.

(21) Appl. No.: 17/822,567

(22) Filed: Aug. 26, 2022

(65) Prior Publication Data

US 2023/0104937 A1   Apr. 6, 2023

(30) Foreign Application Priority Data

Oct. 4, 2021   (JP) .................................. 2021-163567

(51) Int. Cl.
  *G06T 7/70*   (2017.01)
  *G06T 7/73*   (2017.01)
  *G06V 20/58*  (2022.01)

(52) U.S. Cl.
  CPC ............... *G06T 7/74* (2017.01); *G06V 20/58* (2022.01); *G06T 2207/10016* (2013.01); *G06T 2207/30252* (2013.01)

(58) Field of Classification Search
  CPC ........ G06V 20/56–588; G06T 7/70–77; G06T 2207/10016; G06T 2207/30252
  See application file for complete search history.

(56) References Cited

U.S. PATENT DOCUMENTS

2016/0350906 A1*  12/2016  Meier ..................... G06T 7/251
2019/0080481 A1*  3/2019  Yamaguchi .............. G06T 5/73
(Continued)

FOREIGN PATENT DOCUMENTS

JP   2018-179911 A   11/2018
JP   2019-11971 A    1/2019
(Continued)

OTHER PUBLICATIONS

Yamaguchi et al., "Obstacle Detection in Road Scene using Monocular Camera", CVIM, 2005, 34 Pages (with English translation).
(Continued)

*Primary Examiner* — Sean T Motsinger
(74) *Attorney, Agent, or Firm* — Oblon, McClelland, Maier & Neustadt, L.L.P.

(57) ABSTRACT

According to an embodiment, an absolute scale depth calculation device includes a captured image acquisition unit, an ambiguous scale depth deriving unit, a position and posture acquisition unit, and an absolute scale depth deriving unit. The captured image acquisition unit is configured to acquire a plurality of captured images at different imaging time points from an imaging unit mounted on a moving body. The ambiguous scale depth deriving unit is configured to derive ambiguous scale depth information from a captured image. The position and posture acquisition unit is configured to acquire absolute scale position and posture information pertaining to the imaging unit when each of the plurality of captured images is captured. The absolute scale depth deriving unit configured to derive absolute scale depth information, based on a geometrical consistency from the plurality of captured images, the ambiguous scale depth information, and the absolute scale position and posture information.

21 Claims, 12 Drawing Sheets

(56) References Cited

U.S. PATENT DOCUMENTS

| | | | | |
|---|---|---|---|---|
| 2020/0393574 A1* | 12/2020 | Nakamura | ............ | G01C 21/203 |
| 2023/0061831 A1* | 3/2023 | Nishizawa | ................ | G06T 7/74 |
| 2023/0104937 A1* | 4/2023 | Kawasaki | ................ | G06T 7/74 |
| | | | | 382/103 |

FOREIGN PATENT DOCUMENTS

| | | |
|---|---|---|
| JP | 2019-49457 A | 3/2019 |
| JP | 2019-124537 A | 7/2019 |
| JP | 2020-148483 A | 9/2020 |
| WO | WO 2019/167517 A1 | 9/2019 |

OTHER PUBLICATIONS

Wan et al., "Multi-Sensor Fusion Self-Supervised Deep Odometry and Depth Estimation", Remote Sens. 14, 1228, 2022, 19 Pages.

Office Action issued Oct. 8, 2024, in corresponding Japanese Patent Application No. 2021-163567 (with English Translation), citing documents 15-19 therein, 4 pages.

\* cited by examiner

ABSOLUTE SCALE DEPTH CALCULATION DEVICE, ABSOLUTE SCALE DEPTH CALCULATION METHOD, AND COMPUTER PROGRAM PRODUCT

CROSS-REFERENCE TO RELATED APPLICATIONS

This application is based upon and claims the benefit of priority from Japanese Patent Application No. 2021-163567, filed on Oct. 4, 2021; the entire contents of which are incorporated herein by reference.

FIELD

Embodiments described herein relate generally to an absolute scale depth calculation device, an absolute scale depth calculation method, and a computer program product.

BACKGROUND

To achieve safe and comfortable automated driving and travel assistance of vehicles, and autonomous movement of drones and robots, for example, it is necessary to use, as depth information representing a distance to an object, absolute scale depth information representing a scale in the actual space, that is, in the full scale, three dimensional space. By using the absolute scale depth information, it is possible to achieve generation of a travel route that avoids an obstacle, for example.

As a method of calculating absolute scale depth information pertaining to an object, it has been disclosed a method of using captured images captured by a camera mounted on a vehicle (for example, see "Obstacle Detection in Road Scene using Monocular Camera", IPSJ SIG technical reports, Computer Vision and Image Media (CVIM), 69-76, 2005", Koichiro Yamaguchi et al. (Non-Patent Document 1) and WO2019/167517). In Non-Patent Document 1, a three dimensional flat surface of a road surface region calculated from ambiguous scale depth information representing a depth in a relative scale acquired from the captured images is used to derive a camera installation height in an ambiguous scale. Then, in Non-Patent Document 1, it has been disclosed a method of calculating absolute scale depth information by multiplying the ambiguous scale depth information by a ratio between a derived camera installation height in an ambiguous scale and a camera installation height that has been actually measured beforehand. Patent Document 1 discloses that visual simultaneous localization and mapping (SLAM) and global navigation satellite system (GNSS) are combined with each other to convert a position and a posture in an ambiguous scale between cameras into those in the absolute scale. Then, WO2019/167517 discloses a method of using a value used for the conversion and the depth information in an ambiguous scale between cameras in the identical scale to that of the position and the posture to acquire absolute scale depth information.

However, with the technology according to Non-Patent Document 1, it has been difficult to derive absolute scale depth information in an environment where an actually measured value of a height of an installed camera is unknown or an environment where an actually measured value of a height of an installed camera fluctuates as the camera is mounted on a flying object, for example. Furthermore, with the technology according to WO2019/167517, a position and a posture in an ambiguous scale between cameras and depth information in an ambiguous scale between the cameras need to be identical to each other in scale. Therefore, when a method of acquiring a position and a posture and a method of acquiring depth information differ from each other, it has been difficult to derive absolute scale depth information. That is, with such conventional technologies, there may be difficulties in deriving absolute scale depth information from captured images.

DETAILED DESCRIPTION

According to an embodiment, an absolute scale depth calculation device includes a captured image acquisition unit, an ambiguous scale depth deriving unit, a position and posture acquisition unit, and an absolute scale depth deriving unit. The captured image acquisition unit is configured to acquire a plurality of captured images at different imaging time points from an imaging unit mounted on a moving body. The ambiguous scale depth deriving unit is configured to derive ambiguous scale depth information from a captured image. The position and posture acquisition unit is configured to acquire absolute scale position and posture information pertaining to the imaging unit when each of the plurality of captured images is captured. The absolute scale depth deriving unit configured to derive absolute scale depth information, based on a geometrical consistency from the plurality of captured images, the ambiguous scale depth information, and the absolute scale position and posture information.

An absolute scale depth calculation device, an absolute scale depth calculation method, and an absolute scale depth calculation computer program will now be described herein in detail with reference to the accompanying drawings.

Figure 1:
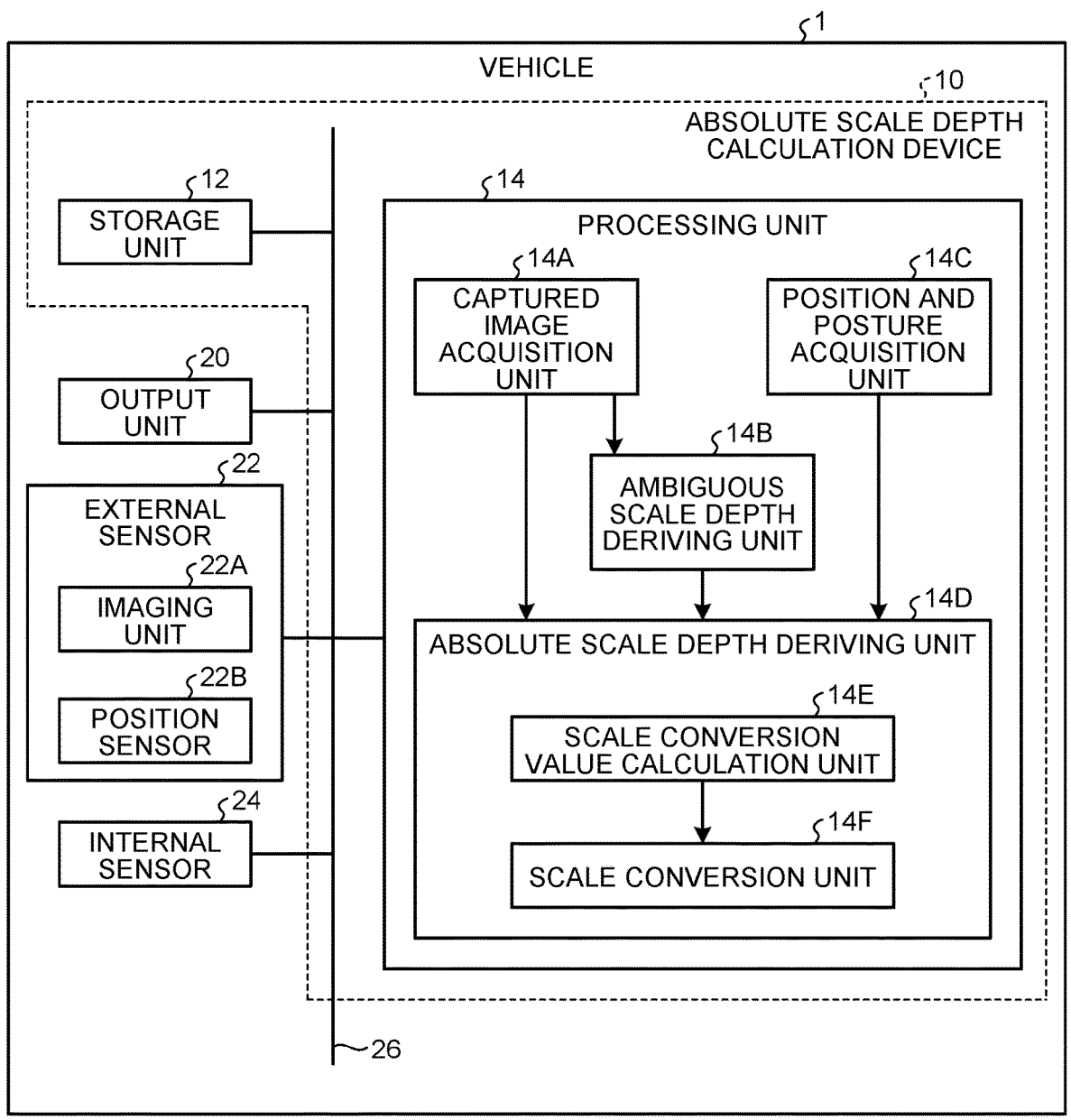
FIG. 1 is a schematic diagram of a vehicle mounted with an absolute scale depth calculation device.

FIG. 1 is a schematic diagram of an example of a vehicle 1 mounted with an absolute scale depth calculation device 10 according to an embodiment.

The vehicle 1 represents an example of a moving body. The moving body represents a movable target. Examples of the moving body include the vehicles 1, pedestrians, robots, flying objects, and ships and vessels. Robots or flying objects include drones that fly in a remote controlled manner or that fly in an autonomous manner. The vehicle 1 may be, for example, a two-wheel vehicle, a four-wheel vehicle, or a bicycle. The present embodiment describes, as an example, a form where the vehicle 1 represents a moving body. Furthermore, the present embodiment also describes, as an example, a case where the vehicle 1 represents a four-wheel vehicle. The vehicle 1 may be, for example, any one of a moving body that travels via driving maneuvers by a person and a moving body that is able to travel autonomously without requiring driving maneuvers by a person.

The vehicle 1 includes the absolute scale depth calculation device 10, an output unit 20, an external sensor 22, and an internal sensor 24. The absolute scale depth calculation device 10, the output unit 20, the external sensor 22, and the internal sensor 24 are communicably coupled to each other via a bus 26, for example.

The output unit 20 is configured to output various types of information. The output unit 20 includes a communication unit, a display unit, and a loudspeaker, for example. The communication unit is configured to send and receive information to and from other information processing devices, for example. The display unit is a display or a projector, for example, configured to display various types of information. The loudspeaker is configured to output sound.

The external sensor 22 and the internal sensor 24 are sensors configured to observe environments around and in the vehicle 1.

The external sensor 22 observes the environment outside the vehicle 1. The external sensor 22 includes, for example, an imaging unit 22A and a position sensor 22B.

The imaging unit 22A is configured to perform imaging to acquire captured image data. The captured image data will be hereinafter referred to as a captured image for description purposes. The imaging unit 22A is, for example, a monocular camera. Captured images may be desired images such as monochrome images and color images.

In the present embodiment, the imaging unit 22A is adjusted beforehand for its installation position, imaging direction, and angle of view of imaging to be able to capture an image of at least a region in front of the vehicle 1 in a travel direction. Note that there is no limitation in the installation position of the imaging unit 22A. The imaging unit 22A performs imaging to acquire a plurality of sequentially captured images in a time series manner.

The vehicle 1 may take a form where the imaging unit 22A is provided in plural. The present embodiment describes, as an example, a form where the vehicle 1 is mounted with the single imaging unit 22A.

The position sensor 22B is configured to detect the position of the vehicle 1. The position sensor 22B constitutes, for example, a global navigation satellite system (GNSS) or a global positioning system (GPS).

The internal sensor 24 observes the environment inside the vehicle 1. The internal sensor 24 observes an angular speed, a degree of acceleration, a speed, a posture, and the travel direction of the vehicle 1, for example. The internal sensor 24 is, for example, an inertial measurement unit (IMU), an acceleration sensor, a speed sensor, a wheel encoder, or a rotary encoder. The IMU is configured to observe a degree of three dimensional acceleration and a three dimensional angular speed of the moving body.

The absolute scale depth calculation device 10 is a device configured to calculate absolute scale depth information from captured images. The absolute scale depth calculation device 10 uses ambiguous scale depth information derived from the captured images to calculate absolute scale depth information, for example.

Depth information refers to information of a depth in a three dimensional space, and refers to information indicating a distance from the imaging unit 22A to a target object. The target object is an example of a photographic subject.

Absolute scale means the actual space, that is, the scale in the full scale, three dimensional space. Absolute scale depth information refers to information indicating a depth in the absolute scale. Particularly, the absolute scale depth information refers to information indicating a distance from the imaging unit 22A to a target object in the full scale, three dimensional space. Specifically, the absolute scale depth information refers to information indicating a distance from the imaging unit 22A to a target object, which is to be acquired in a unit used in the real world, such as meter.

An ambiguous scale means a relative scale. Ambiguous scale depth information refers to information indicating a depth in an ambiguous scale. Particularly, the ambiguous scale depth information refers to information indicating a relative distance from the imaging unit 22A to a target object. Specifically, the ambiguous scale depth information is represented by a relative ratio of a distance from the imaging unit 22A to a target object with respect to a reference distance.

The absolute scale depth calculation device 10 includes a storage unit 12 and a processing unit 14. The storage unit 12, the processing unit 14, the output unit 20, the external sensor 22, and the internal sensor 24 are communicably coupled to each other via the bus 26, for example.

The storage unit 12, the output unit 20, the external sensor 22, and the internal sensor 24 may be configured to be communicably coupled to the processing unit 14 in a wired or wireless manner. At least one of the storage unit 12, the output unit 20, the external sensor 22, and the internal sensor 24 may be coupled to the processing unit 14 via a network.

The storage unit 12 is configured to store various types of data. The storage unit 12 may be a storage device provided outside the absolute scale depth calculation device 10. Furthermore, the absolute scale depth calculation device 10 may have a configuration in which one or at least one of a plurality of functional units included in the storage unit 12 and the processing unit 14 is mounted on an external information processing device communicably coupled to the absolute scale depth calculation device 10 via a network, for example. That is, a form may be taken where one or at least one of a plurality of functional units included in the storage unit 12 and the processing unit 14 is mounted on an information processing device outside the vehicle 1, which is communicably coupled to the vehicle 1, for example.

The processing unit 14 is configured to execute information processing in the absolute scale depth calculation device 10. The processing unit 14 includes a captured image acquisition unit 14A, an ambiguous scale depth deriving unit 14B, a position and posture acquisition unit 14C, and an absolute scale depth deriving unit 14D. The absolute scale depth deriving unit 14D includes a scale conversion value calculation unit 14E and a scale conversion unit 14F.

The captured image acquisition unit 14A, the ambiguous scale depth deriving unit 14B, the position and posture acquisition unit 14C, the absolute scale depth deriving unit 14D, the scale conversion value calculation unit 14E, and the scale conversion unit 14F are achieved by one or a plurality of processors, for example. For example, the components described above may be achieved by causing a processor such as a central processing unit (CPU) to execute a computer program, that is, may be achieved by software. The components described above may be achieved by a processor such as a special integrated circuit (IC), that is, may be achieved by hardware. The components described above may be also achieved by a combination of software and hardware. When a plurality of processors are used, each of the processors may achieve one of the components or two or more of the components.

The captured image acquisition unit 14A is configured to acquire a plurality of captured images at different imaging time points from the imaging unit 22A mounted on the vehicle 1. Note that the imaging unit 22A may store, in the storage unit 12, captured images that are captured sequentially in a time series manner. In this case, the captured image acquisition unit 14A may acquire the captured images from the storage unit 12.

The ambiguous scale depth deriving unit 14B is configured to derive ambiguous scale depth information from the captured images. Particularly, the ambiguous scale depth deriving unit 14B derives ambiguous scale depth information per pixel region contained in each of the captured images. A pixel region may be one of a region in one pixel or a region formed from a plurality of pixels lying adjacent to each other. The present embodiment describes, as an example, a form where the pixel region is a region in one pixel. Therefore, the pixel region may be hereinafter simply referred to as a pixel.

The ambiguous scale depth deriving unit 14B derives ambiguous scale depth information from the captured images with a publicly known method. The ambiguous scale depth deriving unit 14B derives ambiguous scale depth information from each of a plurality of captured images that are captured sequentially in a time series manner. Therefore, the ambiguous scale depth deriving unit 14B derives ambiguous scale depth information corresponding to an imaging time point of each of the captured images.

For example, the ambiguous scale depth deriving unit 14B derives ambiguous scale depth information from the captured images with a geometrical technique using a neural network or simultaneous localization and mapping (SLAM).

Particularly, for example, the ambiguous scale depth deriving unit 14B inputs the captured images into the neural network to derive ambiguous scale depth information per pixel as an output from the neural network. Furthermore, for example, the ambiguous scale depth deriving unit 14B uses Visual SLAM based on corresponding pixels, which uses pixels that are corresponding to each other between the captured images, to derive ambiguous scale depth information. Furthermore, for example, the ambiguous scale depth deriving unit 14B uses Visual SLAM based on a direct technique, which directly uses pixel values of pixels that are corresponding to each other between the captured images through Visual SLAM, to derive ambiguous scale depth information.

The position and posture acquisition unit 14C is configured to acquire absolute scale position and posture information pertaining to the imaging unit 22A when each of the captured image is captured. In accordance with a travel situation of the vehicle 1, the position and the posture of the imaging unit 22A mounted on the vehicle 1 change in a time series manner. The position and posture acquisition unit 14C sequentially acquires absolute scale position and posture information that changes in a time series manner in accordance with the travel situation of the vehicle 1.

Absolute scale position and posture information refers to information indicating the position and the posture of the imaging unit 22A in the actual space, that is, in the full scale, three dimensional space. The position of the imaging unit 22A in the actual space, that is, in the actual, three dimensional space is represented by, for example, a position coordinate in the actual space, that is, in the actual, three dimensional space. The posture of the imaging unit 22A in the actual space, that is, in the actual, three dimensional space represents, for example, the posture of the light axis of a lens provided in the imaging unit 22A.

The position and posture acquisition unit 14C may use a publicly known method to acquire absolute scale position and posture information. For example, the position and posture acquisition unit 14C acquires absolute scale position and posture information from at least one of the external sensor 22 and the internal sensor 24. That is, the position and posture acquisition unit 14C uses sensor information representing an observation result observed sequentially in a time series manner by the external sensor 22 and the internal sensor 24 to acquire absolute scale position and posture information. Therefore, the position and posture acquisition unit 14C acquires absolute scale position and posture information corresponding to each imaging time point.

Particularly, for example, the position and posture acquisition unit 14C calculates, from sensor information acquired from GNSS or IMU, position and posture information in the absolute scale of GNSS or IMU in a coordinate system in GNSS or IMU. Then, the position and posture acquisition unit 14C uses, for example, a conversion matrix in the coordinate system, which is acquired from the installation position of the imaging unit 22A and the installation position of GNSS or IMU, to calculate absolute scale position and posture information pertaining to the imaging unit 22A from position and posture information in the absolute scale of GNSS or IMU.

Furthermore, for example, the position and posture acquisition unit 14C may acquire, via a wheel encoder, absolute scale position and posture information pertaining to the imaging unit 22A. Furthermore, the position and posture acquisition unit 14C may input captured images into the neural network to acquire, as an output from the neural network, ambiguous scale position and posture information pertaining to the imaging unit 22A. Then, the position and posture acquisition unit 14C may use sensor information from GNSS and the wheel encoder to convert the acquired ambiguous scale position and posture information into absolute scale position and posture information.

Furthermore, for example, the position and posture acquisition unit 14C derives ambiguous scale position and posture information pertaining to the imaging unit 22A through Visual SLAM based on corresponding pixels or Visual SLAM based on the direct technique, as described above. Then, the position and posture acquisition unit 14C may use the sensor information from GNSS and the wheel encoder to convert the derived ambiguous scale position and posture information into absolute scale position and posture information. Furthermore, the position and posture acquisition unit 14C may use a marker with an already known size at which it appears on a captured image, for example, to derive absolute scale position and posture information pertaining to the imaging unit 22A.

The absolute scale depth deriving unit 14D is configured to derive, from the captured images, the ambiguous scale depth information, and the absolute scale position and posture information and based on a geometrical consistency, absolute scale depth information pertaining to the captured images. A geometrical consistency means a three dimensional consistency between a coordinate system in a three dimensional space in the absolute scale and a coordinate system in a three dimensional space in an ambiguous scale.

Figure 2:
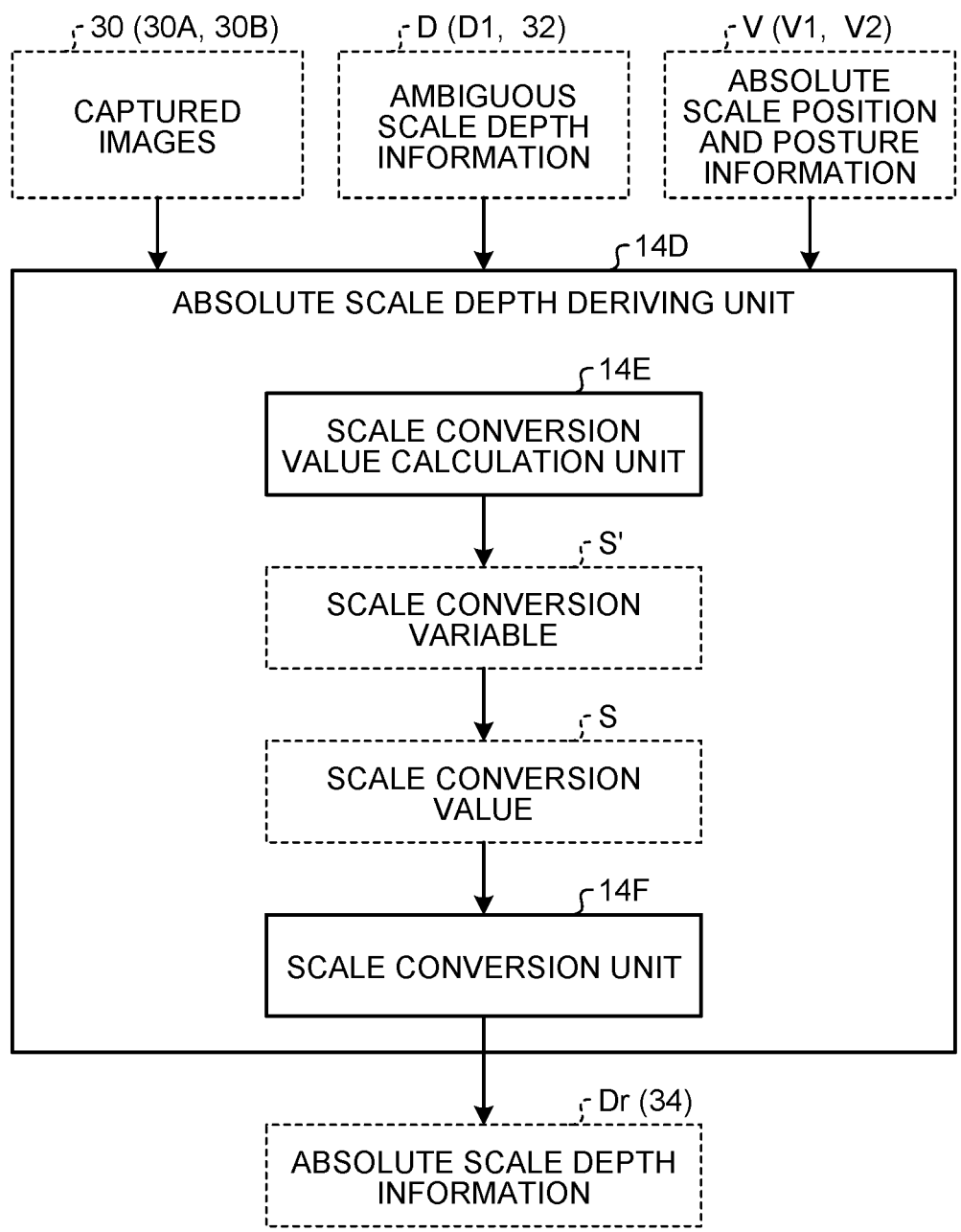
FIG. 2 is an explanatory diagram of a functional configuration of an absolute scale depth deriving unit.

FIG. 2 is an explanatory diagram of an example of a functional configuration of the absolute scale depth deriving unit 14D. The absolute scale depth deriving unit 14D includes the scale conversion value calculation unit 14E and the scale conversion unit 14F.

The scale conversion value calculation unit 14E is configured to accept a plurality of captured images 30 each corresponding to one of a plurality of imaging time points, ambiguous scale depth information D per each of the imaging time points, and absolute scale position and posture information V per each of the imaging time points, from the captured image acquisition unit 14A, the ambiguous scale depth deriving unit 14B, and the position and posture acquisition unit 14C.

The scale conversion value calculation unit 14E uses the captured images 30, the ambiguous scale depth information D, and the absolute scale position and posture information V to calculate a scale conversion value S maximizing a geometrical consistency. The scale conversion value S refers to a conversion value used to convert the ambiguous scale depth information D into absolute scale depth information Dr.

The scale conversion unit 14F is configured to calculate, as the absolute scale depth information Dr, a multiplication result of multiplying the ambiguous scale depth information D by the scale conversion value S calculated by the scale conversion value calculation unit 14E. That is, the scale conversion unit 14F uses Equation (1) described below to calculate the absolute scale depth information Dr.

$$Dr = D \times S \quad \text{Equation (1)}$$

In Equation (1), Dr represents the absolute scale depth information Dr. D represents the ambiguous scale depth information D. S represents the scale conversion value S.

Through the processing by the scale conversion value calculation unit 14E and the scale conversion unit 14F, the absolute scale depth deriving unit 14D derives the absolute scale depth information Dr from the captured images 30.

Calculation processing for the scale conversion value S maximizing a geometrical consistency by the scale conversion value calculation unit 14E will now be described herein in detail.

The scale conversion value calculation unit 14E acquires, from the captured images 30 accepted from the captured image acquisition unit 14A, a first captured image 30A captured at reference time T1 and a second captured image 30B captured at target time T2.

The reference time T1 may be one desired imaging time point among the imaging time points of the captured images 30 included in the captured images 30. The target time T2 may be another imaging time point on a downstream side in a time series direction from the reference time T1.

Note that it is preferable that the scale conversion value calculation unit 14E uses two of the captured images 30 between which an amount of movement of the imaging unit 22A between imaging time points is equal to or above a threshold value among the captured images 30 acquired by the captured image acquisition unit 14A as the first captured image 30A and the second captured image 30B.

That is, it is preferable that the scale conversion value calculation unit 14E uses two imaging time points between which an amount of movement of the imaging unit 22A between the imaging time points is equal to or above a threshold value as the reference time T1 and the target time T2. The scale conversion value calculation unit 14E may calculate, from the absolute scale position and posture information V at each imaging time point, an amount of movement of the imaging unit 22A between two imaging time points, and may use two imaging time points between which the amount of movement is equal to or above the threshold value as the reference time T1 and the target time T2. For the threshold value for an amount of movement, a value making it possible to achieve a geometrical consistency may be set beforehand. Furthermore, the threshold value for an amount of movement may be changeable in accordance with an operation instruction by a user, for example.

The scale conversion value calculation unit 14E further acquires first ambiguous scale depth information D1 representing the ambiguous scale depth information D derived from the first captured image 30A captured at the reference time T1.

Furthermore, the scale conversion value calculation unit 14E acquires first absolute scale position and posture information V1 representing the absolute scale position and posture information V pertaining to the imaging unit 22A at the reference time T1 and second absolute scale position and posture information V2 representing the absolute scale position and posture information V pertaining to the imaging unit 22A at the target time T2.

Then, the scale conversion value calculation unit 14E identifies one or more pairs of coordinate points that are corresponding to each other between the first captured image 30A and the second captured image 30B from the first captured image 30A, the second captured image 30B, the first ambiguous scale depth information D1, the first absolute scale position and posture information V1, and the second absolute scale position and posture information V2. For a pair of coordinate points that are corresponding to each other between the first captured image 30A and the second captured image 30B, for example, a pair of pixels between which a difference in pixel value is below a threshold value may be used. Then, the scale conversion value calculation unit 14E, changes a scale conversion variable S' to calculate the scale conversion variable S' maximizing a geometrical consistency between the pair of coordinate points, as the scale conversion value S. That is, the scale conversion value calculation unit 14E searches for the scale conversion variable S' maximizing a geometrical consistency to calculate the scale conversion value S.

The scale conversion variable S' represents a variable for the scale conversion value S. In other words, the scale conversion variable S' represents a variable taking any value in a space of real numbers. For the scale conversion variable S', a variable may be used that falls within a predetermined range specified by setting at least one of an upper limit and a lower limit.

Note that the scale conversion value calculation unit 14E may use one or more pairs of coordinate points used to identify the scale conversion value S, and the coordinate points to be used are not limited to one pair.

Furthermore, it is preferable that the scale conversion value calculation unit 14E uses coordinate points within a region other than a moving body region representing an image of the moving body, which is contained in each of the captured images 30, as coordinate points used to search for the scale conversion variable S'. By setting coordinate points within a region other than the moving body region, which is contained in each of the captured images 30, it is possible to easily achieve a geometrical consistency, compared with a case when coordinate points are set within the moving body region, making it possible to improve the accuracy in calculating the scale conversion value S. To identify the moving body region contained in each of the captured images 30, a publicly known method may be used. For example, a publicly known object detector may be used to detect the moving body region contained in each of the captured images 30.

There is no limitation for the method of searching for the scale conversion variable S' maximizing a geometrical consistency.

For example, the scale conversion value calculation unit 14E uses a searching method, such as a searching method using points of projection onto the second captured image 30B, a searching method using a warping image, or a searching method using a three dimensional position coordinate between the captured images 30.

The searching methods will now be described herein in detail.

First of all, the searching method using points of projection onto the second captured image 30B will now be described herein.

Figure 3:
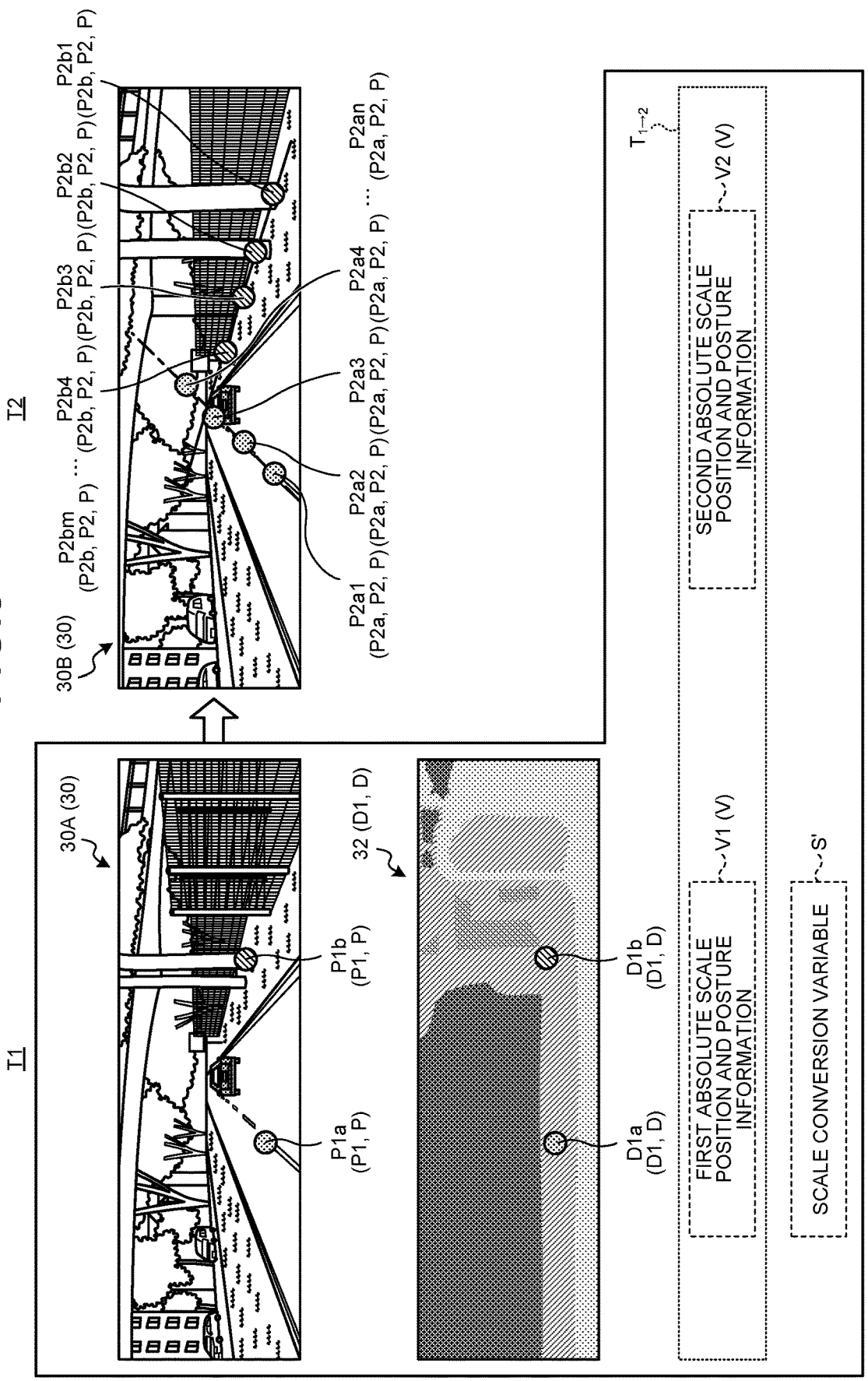
FIG. 3 is an explanatory diagram of a searching method using points of projection onto a second captured image.

FIG. 3 is an explanatory diagram of an example of the searching method using points of projection onto the second captured image 30B.

The scale conversion value calculation unit 14E acquires the first captured image 30A captured at the reference time T1, the second captured image 30B captured at the target time T2, the first ambiguous scale depth information D1 pertaining to the reference time T1, the first absolute scale position and posture information V1 pertaining to the reference time T1, and the second absolute scale position and posture information V2 pertaining to the target time T2.

As described above, the ambiguous scale depth deriving unit 14B derives the ambiguous scale depth information D per pixel contained in each of the captured images 30.

Therefore, the scale conversion value calculation unit 14E acquires an ambiguous scale depth image 32 specified with the first ambiguous scale depth information D1 per pixel contained in the first captured image 30A captured at the reference time T1.

The scale conversion value calculation unit 14E uses these pieces of acquired information and the scale conversion variable S' and, while changing the scale conversion variable S', calculates a second coordinate point P2 representing a point of projection, at which a first coordinate point P1 representing a coordinate point P on the first captured image 30A is projected onto the second captured image 30B.

Particularly, the scale conversion value calculation unit 14E uses Equation (2) to calculate the second coordinate point P2 at which the first coordinate point P1 is projected onto the second captured image 30B.

$$P2 = KT_{1 \to 2} S'D1(P1)K^{-1}P1 \quad \text{Equation (2)}$$

In Equation (2), P1 represents a coordinate (homogeneous coordinate) of the first coordinate point P1 representing a pixel in the first captured image 30A. P2 represents a coordinate (homogeneous coordinate) of the second coordinate point P2 representing a point of projection, at which the first coordinate point P1 is projected onto the second captured image 30B. D1 represents the first ambiguous scale depth information D1. D1(P1) represents the first ambiguous scale depth information D1 pertaining to the first coordinate point P1. $T_{1 \to 2}$ represents a conversion matrix for a position and a posture in the absolute scale from the first absolute scale position and posture information V1 to the second absolute scale position and posture information V2. K represents an internal parameter in the imaging unit 22A.

As represented by Equation (2), the scale conversion value calculation unit 14E multiplies a coordinate of the first coordinate point P1 by $K^{-1}$ to convert the coordinate of the first coordinate point P1 into a coordinate in a normalizing coordinate system at the reference time T1. Then, the scale conversion value calculation unit 14E further multiplies the converted value by S'D1(P1) to convert the coordinate into a coordinate in a camera coordinate system at the reference time T1. The scale conversion value calculation unit 14E further multiplies the converted value by $T_{1 \to 2}$ to convert the coordinate into a coordinate in a camera coordinate system at the target time T2. The scale conversion value calculation unit 14E further multiplies the converted value by K to calculate a coordinate of the second coordinate point P2 representing a point of projection, at which the first coordinate point P1 is projected onto the second captured image 30B captured at the target time T2.

It is assumed in here that the first absolute scale position and posture information V1, the second absolute scale position and posture information V2, and the first ambiguous scale depth information D1 have correct values including their scales. In this case, coordinates of the first coordinate point P1 and the second coordinate point P2 representing a point of projection, at which the first coordinate point P1 is projected onto the second captured image 30B, are supposed to have identical values.

Then, the scale conversion value calculation unit 14E projects, while changing the scale conversion variable S', the first coordinate point P1 on the first captured image 30A onto the second captured image 30B. Then, the scale conversion value calculation unit 14E calculates the scale conversion variable S' maximizing a degree of coincidence between the first coordinate point P1 and its projected point of projection, that is, the second coordinate point P2, as the scale conversion value S.

Particularly, the scale conversion value calculation unit 14E sequentially changes the scale conversion variable S' within a predetermined range, and, each time changing the scale conversion variable S', calculates the coordinate of the second coordinate point P2 by using Equation (2) described above.

Therefore, for example, as illustrated in FIG. 3, as points of projection, which correspond to a first coordinate point P1$a$ serving as an example of the first coordinate point P1 on the first captured image 30A, a plurality of second coordinate points P2$a$1 to P2$a$n calculated by using the scale conversion variables S' that differ from each other are projected onto the second captured image 30B. Note that n is an integer equal to or above 1, and corresponds to the number of points of projection, which are calculated, by using the scale conversion variables S' that differ from each other, for the first coordinate point P1$a$. Furthermore, for example, as points of projection, which correspond to a first coordinate point P1$b$ serving as an example of the first coordinate point P1 on the first captured image 30A, a plurality of second coordinate points P2$b$1 to P2$b$m calculated by using the scale conversion variables S' that differ from each other are projected onto the second captured image 30B. Note that m is an integer equal to or above 1, and corresponds to the number of points of projection, which are calculated, by using the scale conversion variables S' that differ from each other, for the first coordinate point P1$b$.

Then, the scale conversion value calculation unit 14E calculates a degree of coincidence between the first coordinate point P1 and each of the second coordinate points P2 obtained by sequentially changing the scale conversion variable S' for the first coordinate point P1 and performing projection onto the second captured image 30B.

For a degree of coincidence between the first coordinate point P1 and the second coordinate point P2, a difference in luminance, a difference in feature vector acquired from a feature amount descriptor, or a distance may be used. Therefore, a degree of coincidence between the first coordinate point P1 and the second coordinate point P2 indicates a value that increases as a difference in luminance, a difference in feature vector acquired from a feature amount descriptor, or a distance decreases.

Specifically, for example, the scale conversion value calculation unit 14E calculates a degree of coincidence indicating a value that increases as a value of an absolute value of a difference in luminance between the first coordinate point P1 and the second coordinate point P2 decreases. Furthermore, for example, the scale conversion value calculation unit 14E calculates, for the first coordinate point P1 and each of the second coordinate points P2, a degree of coincidence indicating a value that increases as a difference in feature vector acquired from a feature amount descriptor based on an algorithm such as scale-invariant feature transform (SIFT) or speeded up robust features (SURF) decreases. Furthermore, for example, the scale conversion value calculation unit 14E calculates a degree of coincidence indicating a value that increases as a distance between the first coordinate point P1 and the second coordinate point P2 decreases.

Then, the scale conversion value calculation unit 14E calculates, as the scale conversion value S, the scale conversion variable S' used to calculate the second coordinate point P2 representing a point of projection of the first coordinate point P1 maximizing a degree of coincidence.

As described above, the scale conversion value calculation unit 14E may calculate the scale conversion value S by using the searching method using points of projection onto the second captured image 30B.

Next, the searching method using a warping image will now be described herein.

Figure 4:
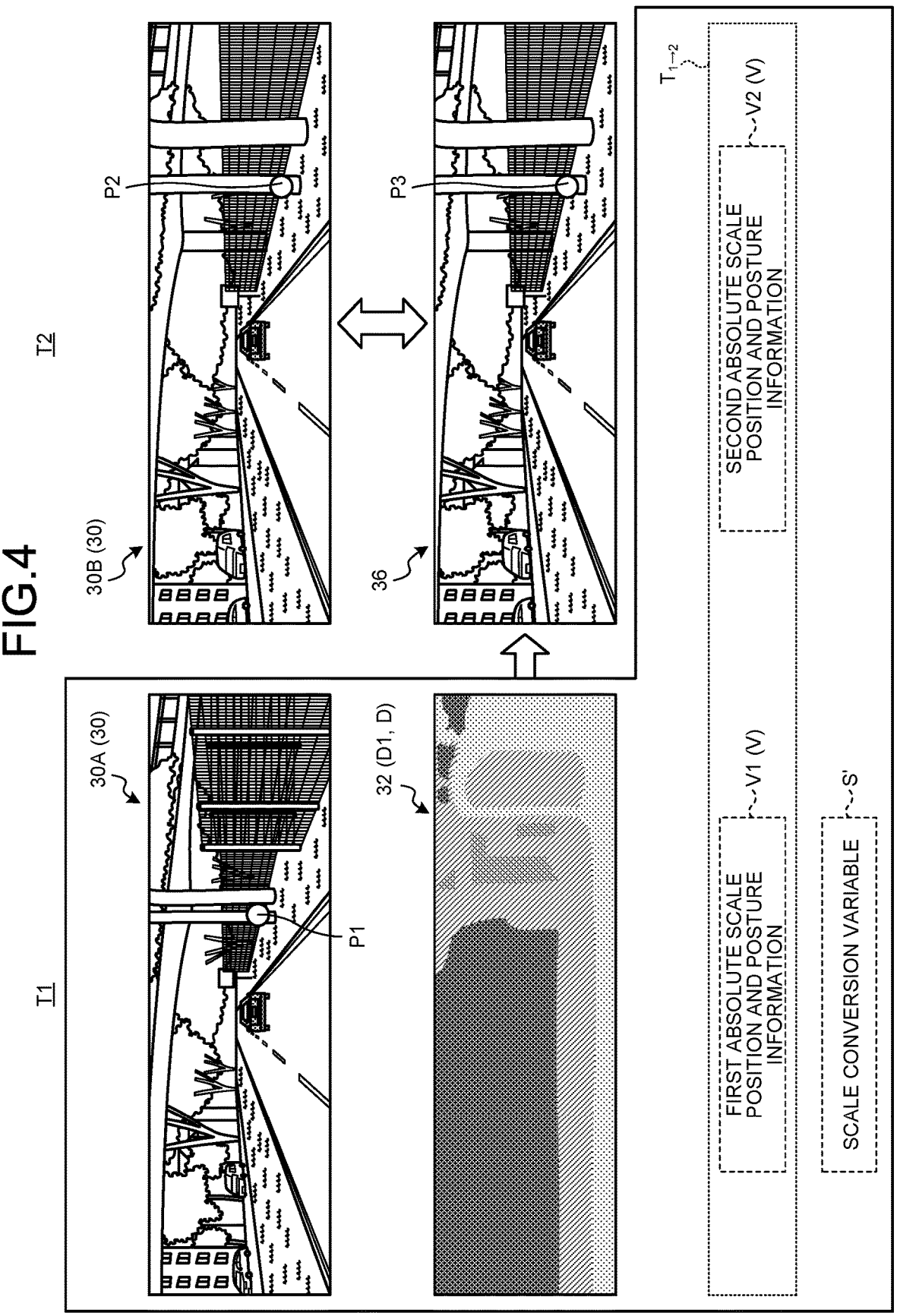
FIG. 4 is an explanatory diagram of a searching method using a warping image.

FIG. 4 is an explanatory diagram of an example of the searching method using a warping image 36.

The scale conversion value calculation unit 14E acquires the first captured image 30A captured at the reference time T1, the second captured image 30B captured at the target time T2, the first ambiguous scale depth information D1 pertaining to the reference time T1, the first absolute scale position and posture information V1 pertaining to the reference time T1, and the second absolute scale position and posture information V2 pertaining to the target time T2. Similar to those described above, the scale conversion value calculation unit 14E acquires the ambiguous scale depth image 32 specified with the first ambiguous scale depth information D1 per pixel contained in the first captured image 30A captured at the reference time T1.

The scale conversion value calculation unit 14E uses these pieces of acquired information and the scale conversion variable S' to convert the first captured image 30A captured at the reference time T1 into the warping image 36 captured by the imaging unit 22A in the absolute scale position and posture represented by the second absolute scale position and posture information V2 pertaining to the target time T2.

Particularly, the scale conversion value calculation unit 14E uses Equation (2) described above per coordinate point of each of a plurality of pixels contained in the first captured image 30A to calculate coordinate points at the target time T2. In this calculation processing, that is, in this warping processing, the warping image 36 containing the coordinate points at the target time T2, which are respectively corresponding to the pixels contained in the first captured image 30A, is generated. That is, the scale conversion value calculation unit 14E causes the first captured image 30A to undergo the warping processing to generate the warping image 36 captured by the imaging unit 22A in an absolute scale position and posture at the target time T2.

When the first absolute scale position and posture information V1, the second absolute scale position and posture information V2, and the first ambiguous scale depth information D1 indicate correct values including their scales, the second captured image 30B and the warping image 36 are supposed to be identical images. That is, when a degree of coincidence is maximum between the warping image 36 and the second captured image 30B, it is possible to determine that a maximum geometrical consistency is maximum and a correct scale conversion has been performed.

Then, the scale conversion value calculation unit 14E generates the warping image 36 while changing the scale conversion variable S'. Particularly, the scale conversion value calculation unit 14E repeatedly executes the warping processing while changing the scale conversion variable S' within a predetermined range to calculate the warping images 36 respectively corresponding to the scale conversion variables S' that differ from each other.

Then, the scale conversion value calculation unit 14E calculates, as the scale conversion value S, the scale conversion variable S' maximizing a degree of coincidence between a coordinate point contained in each of the warping images 36 and a coordinate point contained in the second captured image 30B, which lies at an identical coordinate.

For example, as illustrated in FIG. 4, a situation is assumed where the first coordinate point P1 on the first captured image 30A is positioned at a coordinate of the coordinate point P3 on the warping image 36 through the warping processing. In this case, the scale conversion value calculation unit 14E calculates a degree of coincidence between a pixel at the coordinate of the coordinate point P3 on the warping image 36 and a pixel at the second coordinate point P2, the coordinate of which is identical to that of the coordinate point P3, on the second captured image 30B. Similarly, the scale conversion value calculation unit 14E calculates a degree of coincidence between each of a plurality of pixels contained in the warping image 36 and each of pixels contained in the second captured image 30B, which lies at an identical coordinate.

For a degree of coincidence between one or a plurality of pixels, that is, respective coordinate points, contained in the warping image 36 and coordinate points contained in the second captured image 30B, which lie at identical coordinates, a difference in luminance, a difference in feature vector acquired from a feature amount descriptor, or a distance may be used. That is, a degree of coincidence between a coordinate point contained in the warping image 36 and a coordinate point contained in the second captured image 30B, which lies at an identical coordinate, indicates a value that increases as a difference in luminance, a difference in feature vector acquired from a feature amount descriptor, or a distance decreases.

Note that the scale conversion value calculation unit 14E may calculate, as a degree of coincidence between the warping image 36 and the second captured image 30B, an average value of degrees of coincidence between respective coordinate points of all pixels contained in the warping image 36 and coordinate points of pixels contained in the second captured image 30B, which lie at identical coordinates.

Then, the scale conversion value calculation unit 14E calculates, as the scale conversion value S, the scale conversion variable S' used to calculate the warping image 36 maximizing a degree of coincidence.

As described above, the scale conversion value calculation unit 14E may calculate the scale conversion value S by using the searching method using the warping image 36.

Note that searching for the scale conversion variable S' maximizing a geometrical consistency is not limited to the searching within a predetermined range as described above. That is, the scale conversion variable S' may be a variable taking any value, and is not limited to a variable taking any value that falls within a predetermined range in a space of real numbers. For example, the scale conversion variable S' may be a solution to a minimization problem where a degree of coincidence described above serves as an object function. In this case, the scale conversion value calculation unit 14E may acquire a solution to the minimization problem where a degree of coincidence serves as the object function to search for the scale conversion variable S'.

Furthermore, the scale conversion variable S' may be a ratio of an absolute scale installation height of the imaging unit 22A, which represents a variable, with respect to an ambiguous scale installation height of the imaging unit 22A.

Figure 5:
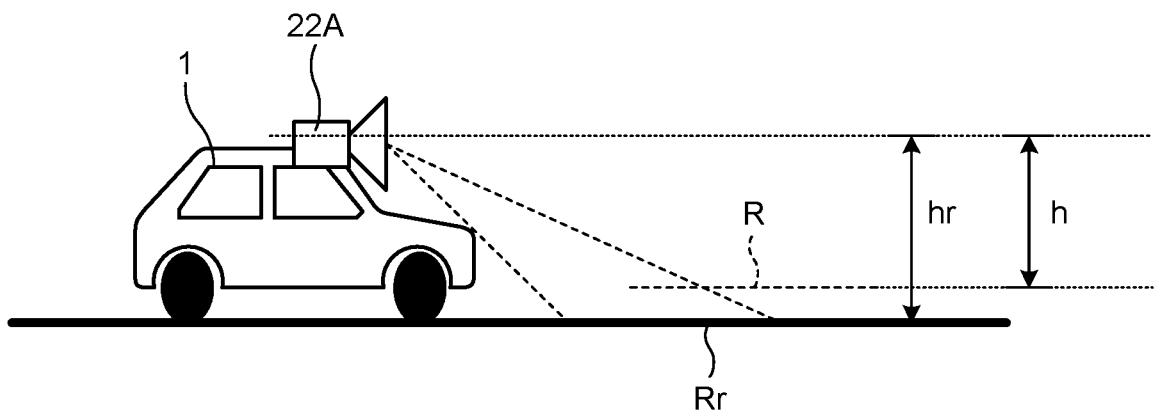
FIG. 5 is an explanatory diagram of a ratio of an absolute scale installation height with respect to an ambiguous scale installation height.

FIG. 5 is an explanatory diagram of an example of a ratio of an absolute scale installation height hr of the imaging unit 22A with respect to an ambiguous scale installation height h of the imaging unit 22A.

There may be a case where there has not yet been acquired an actually measured value of the absolute scale installation height hr of the imaging unit 22A, which represents a height in the absolute scale with respect to a road surface. However, when the imaging unit 22A is mounted on the vehicle 1, a value range, which represents a range of values the absolute scale installation height hr may take, is limited within a range of an ordinary vehicle height of the vehicle 1. As the value range of the absolute scale installation height hr is limited, a range of search is limited, suppressing such cases that there are mere local solutions.

Then, the scale conversion value calculation unit 14E derives an ambiguous scale three dimensional flat surface R corresponding to a road surface region based on the first ambiguous scale depth information D1. The scale conversion value calculation unit 14E acquires, from the first ambiguous scale depth information D1 pertaining to each of a plurality of pixels contained in the ambiguous scale depth image 32, a three dimensional point group of these pixels, and, by using a method such as flat surface fitting using a least square method, derives the ambiguous scale three dimensional flat surface R. Next, the scale conversion value calculation unit 14E calculates the ambiguous scale installation height h representing an installation height of the imaging unit 22A in an ambiguous scale based on the ambiguous scale three dimensional flat surface R. The scale conversion value calculation unit 14E may acquire an intercept of the ambiguous scale three dimensional flat surface R to calculate the ambiguous scale installation height h.

The scale conversion value calculation unit 14E uses, as the scale conversion variable S', a ratio of the absolute scale installation height hr of the imaging unit 22A, which represents a variable, with respect to the calculated ambiguous scale installation height h. In this case, the scale conversion variable S' is represented by Equation (3) described below.

$$S' = hr/h \quad \text{Equation (3)}$$

In Equation (3), S' represents the scale conversion variable S'. hr represents the absolute scale installation height hr. h represents the ambiguous scale installation height h.

The scale conversion value calculation unit 14E changes the absolute scale installation height hr, which represents a variable, within the range of the value range, that is, within the range of the ordinary vehicle height of the vehicle 1, to sequentially change the scale conversion variable S'. Then, the scale conversion value calculation unit 14E may change the scale conversion variable S' by changing the absolute scale installation height hr to calculate the scale conversion value S by using the searching method using points of projection onto the second captured image 30B, as described above, or the searching method using the warping image 36, as described above.

Next, the searching method using a three dimensional position coordinate between the captured images 30 will now be described herein.

Figure 6:
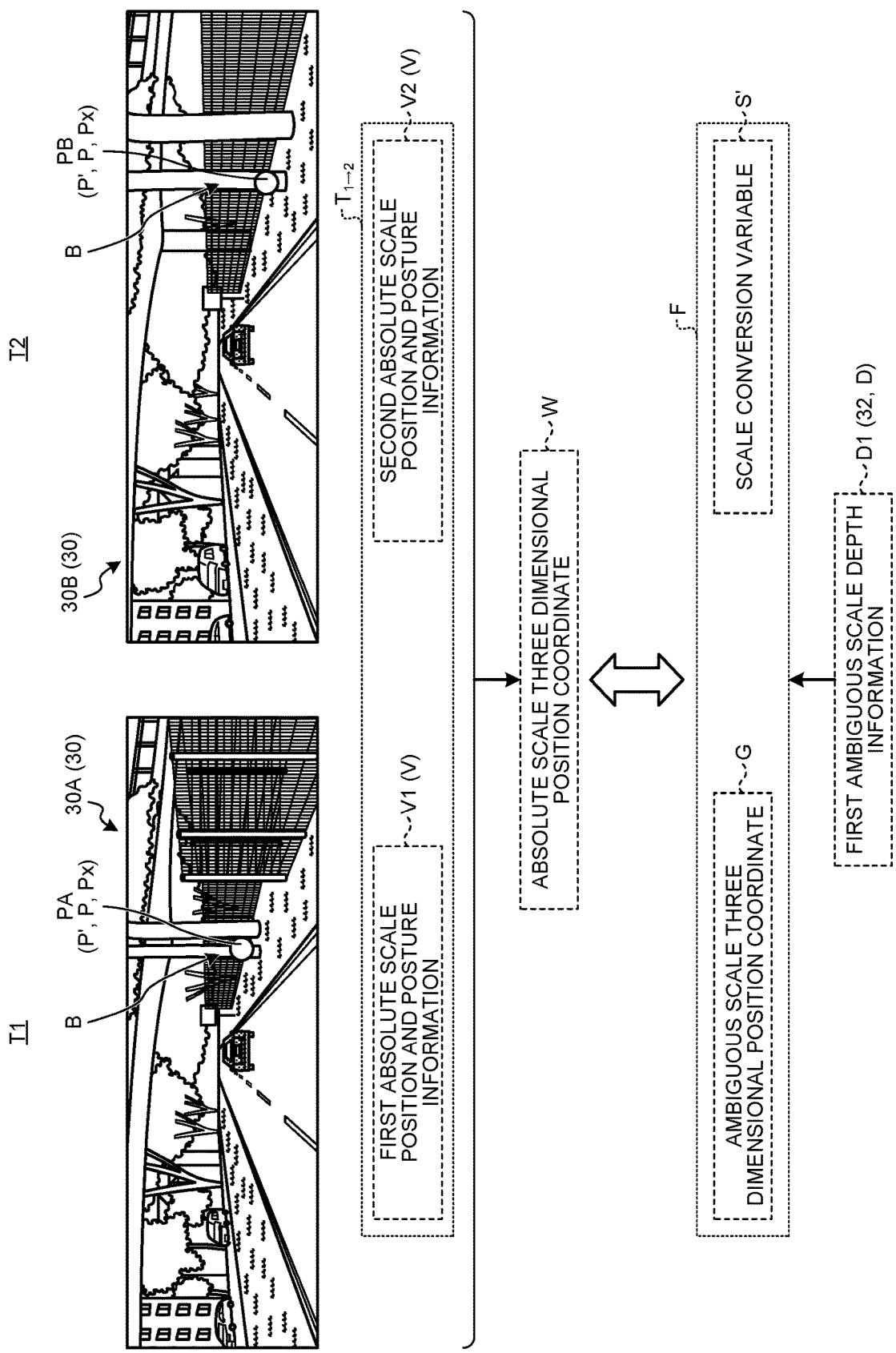
FIG. 6 is an explanatory diagram of a searching method using a three dimensional position coordinate between captured images.

FIG. 6 is an explanatory diagram of an example of the searching method using a three dimensional position coordinate between the captured images 30.

The scale conversion value calculation unit 14E acquires the first captured image 30A captured at the reference time T1, the second captured image 30B captured at the target time T2, the first ambiguous scale depth information D1 pertaining to the reference time T1, the first absolute scale position and posture information V1 pertaining to the reference time T1, and the second absolute scale position and posture information V2 pertaining to the target time T2.

The scale conversion value calculation unit 14E identifies a corresponding point P' forming a pair with the corresponding coordinate point P on an identical target object B between the first captured image 30A and the second captured image 30B. Particularly, the scale conversion value calculation unit 14E identifies, as the corresponding point P', a pair of a coordinate point PA on the target object B contained in the first captured image 30A and a coordinate point PB on the identical target object B contained in the second captured image 30B. That is, the coordinate point PA and the coordinate point PB representing a pair of the coordinate points P constituting the corresponding point P' represent identical positions on the target object B that is present in the actual space.

The scale conversion value calculation unit 14E may use a publicly known feature point detection and matching method, for example, to identify, as the corresponding point P', a pair of the corresponding coordinate points P, representing the identical target object B, in the captured images 30 (the first captured image 30A and the second captured image 30B).

The scale conversion value calculation unit 14E may identify one or more corresponding points P'. FIG. 6 illustrates an example when one corresponding point P' is identified.

The scale conversion value calculation unit 14E derives, from the corresponding point P', the first absolute scale position and posture information V1, and the second absolute scale position and posture information V2, an absolute scale three dimensional position coordinate W at an absolute scale point on the target object B, which is indicated by the corresponding point P' through triangulation. As described above, the coordinate point PA and the coordinate point PB representing a pair of the coordinate points P constituting the corresponding point P' represent identical positions on the target object B that is present in the actual space. Therefore, the scale conversion value calculation unit 14E uses triangulation using the corresponding point P' formed from a pair of the coordinate point PA and the coordinate point PB, the first absolute scale position and posture information V1, and the second absolute scale position and posture information V2 to derive the absolute scale three dimensional position coordinate W representing a three dimensional position coordinate at an absolute scale point on the target object B in the actual space.

Furthermore, the scale conversion value calculation unit 14E calculates, from the first ambiguous scale depth information D1, an ambiguous scale three dimensional position coordinate G of the corresponding point P'. The scale conversion value calculation unit 14E acquires the ambiguous scale depth image 32 specified with the first ambiguous scale depth information D1 per pixel contained in the first captured image 30A captured at the reference time T1, which has been derived by the ambiguous scale depth deriving unit 14B (see also FIG. 4). Then, the scale conversion value calculation unit 14E identifies, from the ambiguous scale depth image 32, the first ambiguous scale depth information D1 pertaining to a pixel at an identical coordinate to that of the coordinate point PA on the first captured image 30A, which constitutes the corresponding point P'. Then, the scale conversion value calculation unit 14E calculates, from the identified first ambiguous scale depth information D1, the ambiguous scale three dimensional position coordinate G of the corresponding point P'.

In a state where a geometrical consistency is satisfied, it is supposed that there is a coincidence between the absolute scale three dimensional position coordinate W calculated from the corresponding point P' and an ambiguous scale multiplication three dimensional position coordinate F obtained by multiplying the ambiguous scale three dimensional position coordinate G calculated from the first ambiguous scale depth information D1 by the scale conversion variable S'.

Therefore, the scale conversion value calculation unit 14E changes the scale conversion variable S' to calculate, as the scale conversion value S, the scale conversion variable S' maximizing a degree of coincidence between the absolute scale three dimensional position coordinate W and the ambiguous scale multiplication three dimensional position coordinate F representing a multiplication result of the ambiguous scale three dimensional position coordinate G by the scale conversion variable S'.

For a degree of coincidence between the absolute scale three dimensional position coordinate W and the ambiguous scale multiplication three dimensional position coordinate F, a difference in distance or a difference in depth between three dimensional coordinates, that is, between the absolute scale three dimensional position coordinate W and the ambiguous scale multiplication three dimensional position coordinate F is used. That is, a degree of coincidence between the absolute scale three dimensional position coordinate W and the ambiguous scale multiplication three dimensional position coordinate F indicates a value that increases as a difference in distance or a difference in depth between three dimensional coordinates, that is, between the absolute scale three dimensional position coordinate W and the ambiguous scale multiplication three dimensional position coordinate F decreases.

Then, the scale conversion value calculation unit 14E calculates, as the scale conversion value S, the scale conversion variable S' used to calculate the ambiguous scale multiplication three dimensional position coordinate F maximizing a degree of coincidence between the absolute scale three dimensional position coordinate W and the ambiguous scale multiplication three dimensional position coordinate F.

As described above, the scale conversion value calculation unit 14E may use the searching method using a three dimensional position coordinate between the captured images 30 to calculate the scale conversion value S.

Now back to FIG. 2 description is continued. As described above, the scale conversion unit 14F derives, as the absolute scale depth information Dr, a multiplication result of multiplying the ambiguous scale depth information D by the scale conversion value S that the scale conversion value calculation unit 14E has calculated.

Particularly, for example, the scale conversion unit 14F acquires the ambiguous scale depth image 32 specified with the first ambiguous scale depth information D1 per pixel contained in the first captured image 30A captured at the reference time T1. Then, the scale conversion unit 14F multiplies the first ambiguous scale depth information D1 per pixel contained in the ambiguous scale depth image 32 by the scale conversion value S. Through this multiplication processing, the scale conversion unit 14F calculates an absolute scale depth image 34 specified with the absolute scale depth information Dr per pixel. Note that the scale conversion unit 14F multiplies at least some of the pixels contained in the ambiguous scale depth image 32 by the scale conversion value S to calculate the absolute scale depth image 34. That is, the scale conversion unit 14F may calculate the absolute scale depth information Dr pertaining to some of the pixels contained in the ambiguous scale depth image 32.

The scale conversion unit 14F outputs the calculated absolute scale depth information Dr to the output unit 20. The outputting the absolute scale depth information Dr to the output unit 20 allows the scale conversion value calculation unit 14E to output the absolute scale depth information Dr to an information processing device outside the vehicle 1. Furthermore, the scale conversion value calculation unit 14E is able to cause the display unit to display the absolute scale depth information Dr. Furthermore, the scale conversion unit 14F may cause the storage unit 12 to store the calculated absolute scale depth information Dr.

Next, an example of a flow of the information processing that the absolute scale depth calculation device 10 executes will now be described herein.

Figure 7:
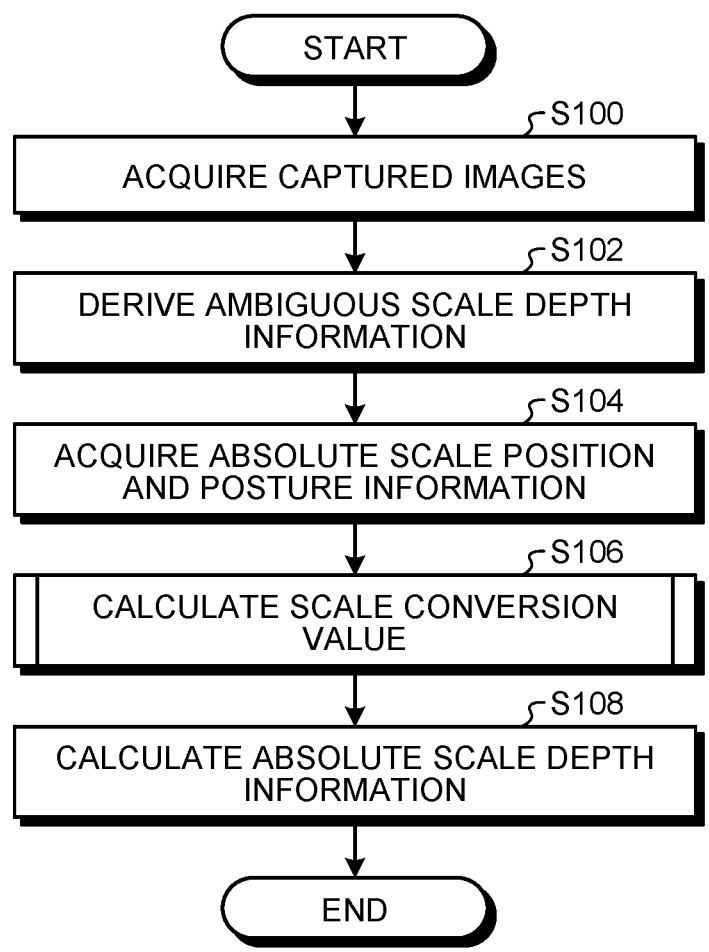
FIG. 7 is a flowchart of a flow of information processing.

FIG. 7 is a flowchart illustrating an example of a flow of the information processing that the absolute scale depth calculation device 10 according to the present embodiment executes.

The captured image acquisition unit 14A acquires the captured images 30 that the imaging unit 22A has captured at different imaging time points (step S100).

The ambiguous scale depth deriving unit 14B derives the ambiguous scale depth information D from each of the captured images 30 acquired at step S100 (step S102).

The position and posture acquisition unit 14C acquires the absolute scale position and posture information V pertaining to the imaging unit 22A when each of the captured images 30 acquired at step S100 is captured (step S104).

The scale conversion value calculation unit 14E uses the captured images 30, the ambiguous scale depth information D, and the absolute scale position and posture information V, which are acquired at steps S100 to S104, to calculate the scale conversion value S maximizing a geometrical consistency (step S106). Scale conversion value calculation processing representing the processing performed at step S106 will be described later in detail.

The scale conversion unit 14F calculates, as the absolute scale depth information Dr, a multiplication result of multiplying the ambiguous scale depth information D acquired at step S102 by the scale conversion value S calculated at step S106 (step S108). Then, the routine ends.

Next, an example of a flow of the scale conversion value calculation processing performed at step S106 will now be described herein.

Figure 8:
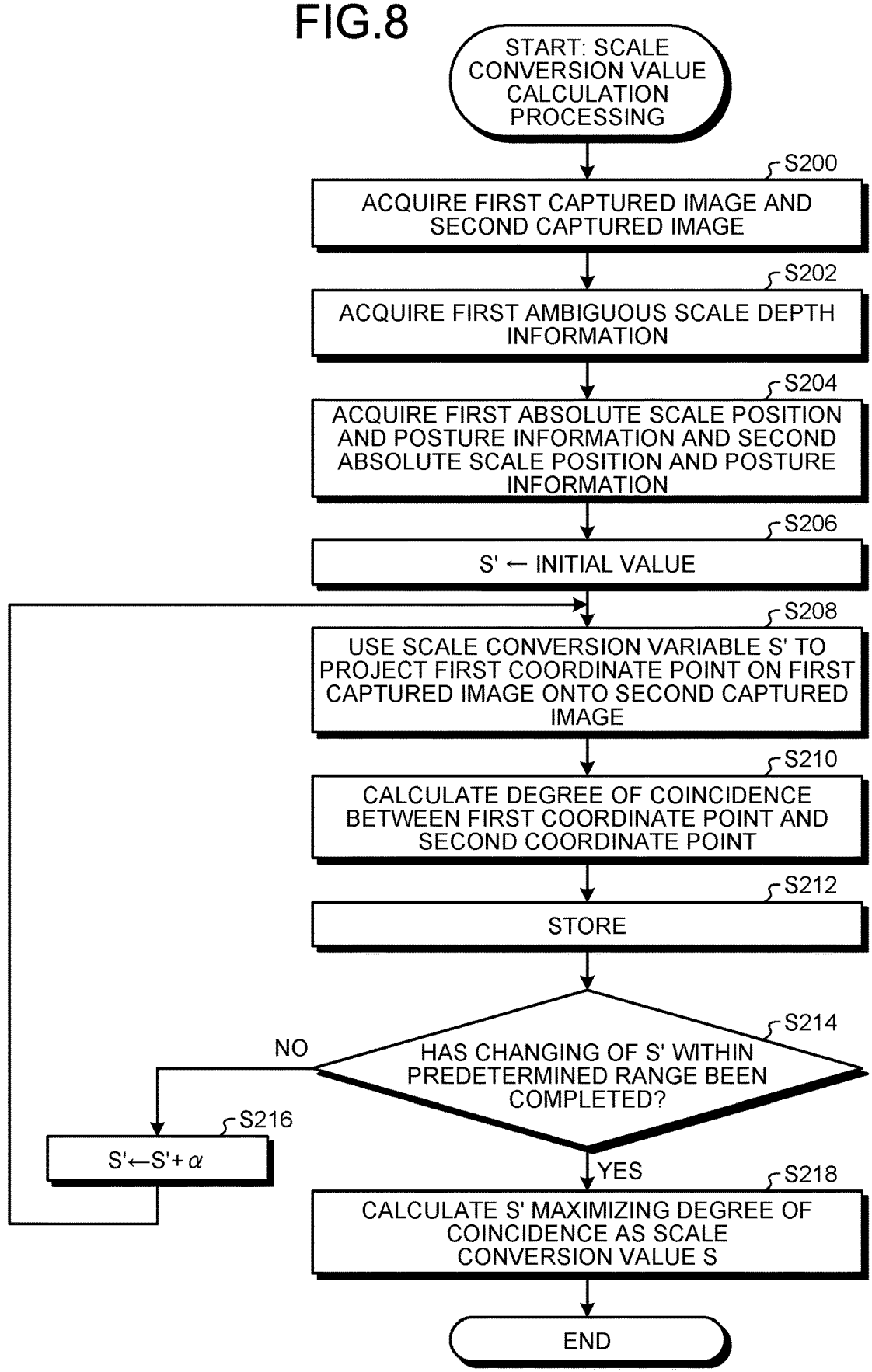
FIG. 8 is a flowchart of a flow of scale conversion value calculation processing by using a searching method using points of projection.

FIG. 8 is a flowchart illustrating an example of a flow of scale conversion value calculation processing by using the searching method using points of projection onto the second captured image 30B. FIG. 8 illustrates a case when the scale conversion variable S' represents a variable taking any value that falls within a predetermined range in a space of real numbers.

The scale conversion value calculation unit 14E acquires the first captured image 30A and the second captured image 30B (step S200). The scale conversion value calculation unit 14E acquires, from the captured images 30 acquired at step S100 (see FIG. 7), the first captured image 30A captured at the reference time T1 and the second captured image 30B captured at the target time T2 to acquire the first captured image 30A and the second captured image 30B.

Furthermore, the scale conversion value calculation unit 14E acquires the first ambiguous scale depth information D1 pertaining to the reference time T1 (step S202). The scale conversion value calculation unit 14E acquires the first ambiguous scale depth information D1 derived from the first captured image 30A captured at a imaging time point, that is, the reference time T1, from the ambiguous scale depth information D derived at step S102 (see FIG. 7). Particularly, the scale conversion value calculation unit 14E acquires the ambiguous scale depth image 32 specified with the first ambiguous scale depth information D1 per pixel.

Furthermore, the scale conversion value calculation unit 14E acquires the first absolute scale position and posture information V1 and the second absolute scale position and posture information V2 (step S204). The ambiguous scale depth deriving unit 14B acquires the first absolute scale position and posture information V1 pertaining to the imaging unit 22A at the reference time T1 and the second absolute scale position and posture information V2 pertaining to the imaging unit 22A at the target time T2 from the absolute scale position and posture information V acquired at step S104 (see FIG. 7). Through the processing performed at step S204, the scale conversion value calculation unit 14E acquires the conversion matrix $T_{1\to2}$ for a position and a posture in the absolute scale from the first absolute scale position and posture information V1 to the second absolute scale position and posture information V2.

Next, the scale conversion value calculation unit 14E sets a predetermined initial value that falls within a predetermined range to the scale conversion variable S' (step S206). For example, the scale conversion value calculation unit 14E regards a lower limit value of the predetermined range as the initial value to set the initial value to the scale conversion variable S'.

The scale conversion value calculation unit 14E uses the set scale conversion variable S' to calculate the second coordinate point P2 representing a point of projection when the first coordinate point P1 on the first captured image 30A is projected onto the second captured image 30B (step S208). The scale conversion value calculation unit 14E uses Equation (2) described above to calculate the second coordinate point P2 representing one when the first coordinate point P1 is projected onto the second captured image 30B.

Next, the scale conversion value calculation unit 14E calculates a degree of coincidence between the first coordinate point P1 used for the calculation at step S208 and the second coordinate point P2 used for the calculation at step S208 (step S210). For example, the scale conversion value calculation unit 14E calculates a degree of coincidence representing a value that increases as a difference in luminance, a difference in feature vector acquired from a feature amount descriptor, or a distance between the first coordinate point P1 and the second coordinate point P2 decreases.

Then, the scale conversion value calculation unit 14E associates the degree of coincidence calculated at step S210 with the scale conversion variable S' used to calculate the degree of coincidence and causes the storage unit 12 to store the degree of coincidence and the variable (step S212).

Next, the scale conversion value calculation unit 14E determines whether changing of the scale conversion variable S' within the predetermined range has been completed (step S214). For example, the scale conversion value calculation unit 14E determines whether changing of the scale conversion variable S' within the predetermined range, expanding from the lower limit value to an upper limit value, has been completed. Specifically, for example, the scale conversion value calculation unit 14E may determine whether a value of the currently set scale conversion variable S' has reached the upper limit value of the predetermined range to perform the determination at step S214.

When there is a negative determination at step S214 (No at step S214), the flow proceeds to step S216. At step S216, a value obtained by adding a predetermined value α that has been set beforehand to the value of the currently set scale conversion variable S' is set as a new value of the scale conversion variable S' (step S216). For the predetermined value α, the predetermined range may be divided into a plurality of subranges, and a value falling within each of the subranges may be set. Then, the flow returns to step S208 described above.

On the other hand, when there is a positive determination at step S214 (Yes at step S214), the flow proceeds to step S218. At step S218, the scale conversion value calculation unit 14E calculates, as the scale conversion value S, the scale conversion variable S' used to calculate the second coordinate point P2 representing the point of projection of the first coordinate point P1 maximizing a degree of coincidence (step S218). The scale conversion value calculation unit 14E may regard, as the scale conversion value S, the scale conversion variable S' indicating a value maximizing a degree of corresponding coincidence among the scale conversion variables S' stored in the storage unit 12.

Then, the scale conversion value calculation unit 14E ends the routine.

Next, an example of a flow of the scale conversion value calculation processing by using the searching method using the warping image 36 will now be described herein.

Figure 9:
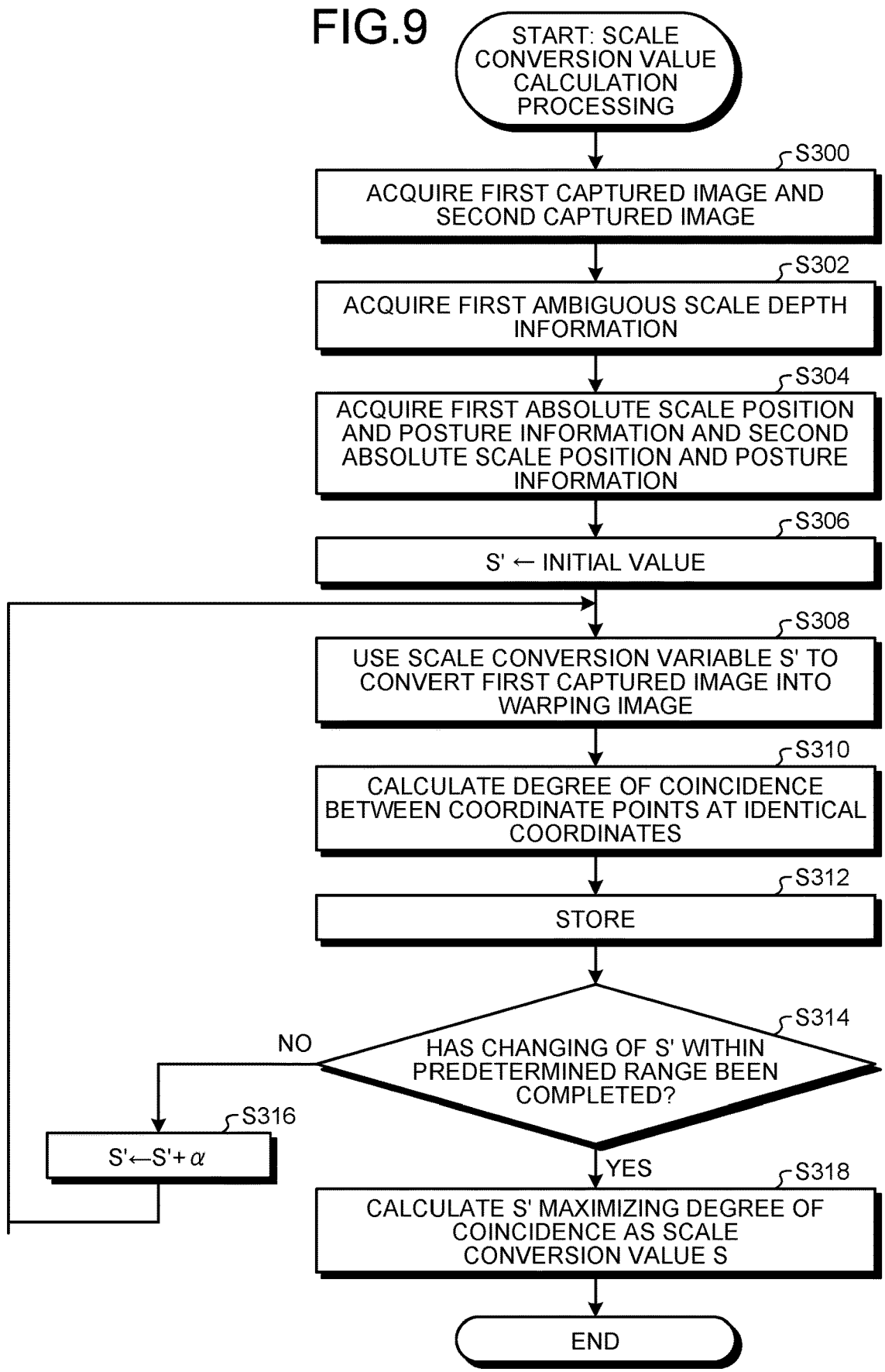
FIG. 9 is a flowchart of a flow of scale conversion value calculation processing by using a searching method using a warping image.

FIG. 9 is a flowchart illustrating an example of a flow of the scale conversion value calculation processing by using the searching method using the warping image 36. FIG. 9 illustrates a case when the scale conversion variable S' represents a variable taking any value that falls within a predetermined range in a space of real numbers.

The scale conversion value calculation unit 14E performs processing at steps S300 to S306, similar to steps S200 to S206 (see FIG. 8).

Particularly, the scale conversion value calculation unit 14E acquires the first captured image 30A and the second captured image 30B (step S300). Furthermore, the scale conversion value calculation unit 14E acquires the first ambiguous scale depth information D1 pertaining to the reference time T1 (step S302). Furthermore, the scale conversion value calculation unit 14E acquires the first absolute scale position and posture information V1 and the second absolute scale position and posture information V2 (step S304).

Next, the scale conversion value calculation unit 14E sets an initial value that has been set beforehand within a predetermined range to the scale conversion variable S' (step S306). For example, the scale conversion value calculation unit 14E regards a lower limit value of the predetermined range as the initial value to set the initial value to the scale conversion variable S'. Note that, for the predetermined range used for the processing illustrated in FIG. 9, an identical range to the predetermined range used for the processing illustrated in FIG. 8 may be used or a different range may be used.

Next, the scale conversion value calculation unit 14E uses the set scale conversion variable S' to convert the first captured image 30A into the warping image 36 captured by the imaging unit 22A in the absolute scale position and posture represented by the second absolute scale position and posture information V2 pertaining to the target time T2 (step S308).

Then, the scale conversion value calculation unit 14E calculates a degree of coincidence between the coordinate points contained in the warping image 36 and coordinate points contained in the second captured image 30B, which lie at identical coordinates (step S310). For example, the scale conversion value calculation unit 14E calculates a degree of coincidence representing a value that increases as a difference in luminance, a difference in feature vector acquired from a feature amount descriptor, or a distance between the coordinate points decreases.

Then, the scale conversion value calculation unit 14E associates the degree of coincidence calculated at step S310 with the scale conversion variable S' used to calculate the degree of coincidence and causes the storage unit 12 to store the degree of coincidence and the variable (step S312).

Next, the scale conversion value calculation unit 14E determines whether changing of the scale conversion variable S' within the predetermined range has been completed (step S314). For example, the scale conversion value calculation unit 14E determines whether changing of the scale conversion variable S' within the predetermined range, expanding from the lower limit value to an upper limit value, has been completed. Specifically, for example, the scale conversion value calculation unit 14E may determine whether a value of the currently set scale conversion variable S' has reached the upper limit value of the predetermined range to perform the determination at step S314.

When there is a negative determination at step S314 (No at step S314), the flow proceeds to step S316. At step S316, a value obtained by adding a predetermined value α that has been set beforehand to the value of the currently set scale conversion variable S' is set as a new value of the scale conversion variable S' (step S316). For the predetermined value α, an identical value as that used at step S216 described above may be used, or a different value may be used. Then, the flow returns to step S308 described above.

On the other hand, when there is a positive determination at step S314 (Yes at step S314), the flow proceeds to step S318. At step S318, the scale conversion value calculation unit 14E calculates, as the scale conversion value S, the scale conversion variable S' used to calculate the warping image 36 pertaining to the coordinate points maximizing a degree of coincidence (step S318). The scale conversion value calculation unit 14E may regard, as the scale conversion value S, the scale conversion variable S' indicating a value maximizing a degree of corresponding coincidence among the scale conversion variables S' stored in the storage unit 12.

Then, the scale conversion value calculation unit 14E ends the routine.

Next, an example of a flow of processing when using, as the scale conversion variable S', a ratio hr/h of the absolute scale installation height hr with respect to the ambiguous scale installation height h will now be described herein.

Figure 10:
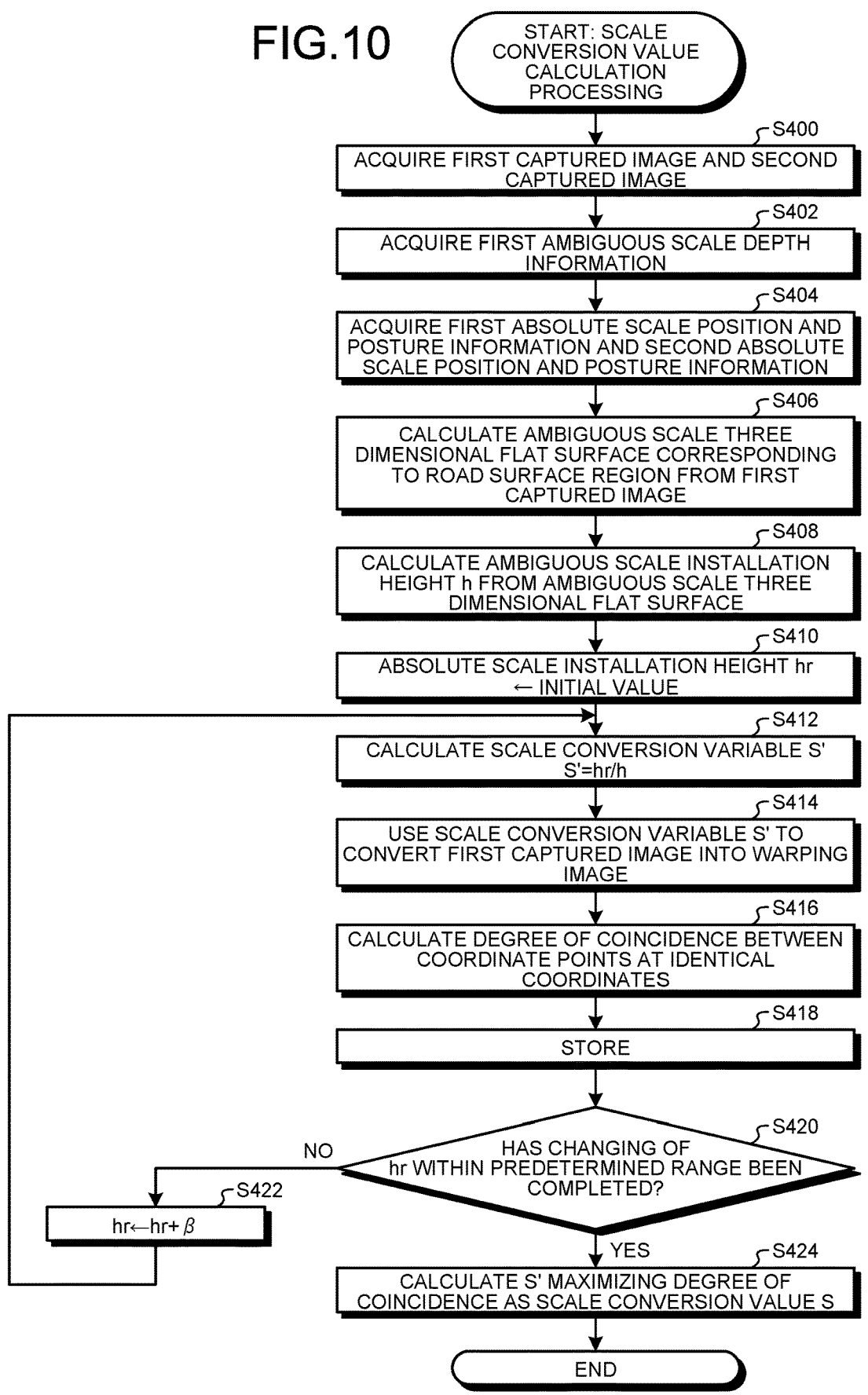
FIG. 10 is a flowchart of a flow of processing when using a ratio of an absolute scale installation height with respect to an ambiguous scale installation height.

FIG. 10 is a flowchart illustrating an example of a flow of the processing when using, as the scale conversion variable S', the ratio hr/h of the absolute scale installation height hr with respect to the ambiguous scale installation height h. FIG. 10 illustrates, as an example, a case when using the ratio hr/h as the scale conversion variable S' in the searching method using the warping image 36.

The scale conversion value calculation unit 14E performs processing at steps S400 to S404, similar to steps S300 to S304 (see FIG. 9).

Particularly, the scale conversion value calculation unit 14E acquires the first captured image 30A and the second captured image 30B (step S400). Furthermore, the scale conversion value calculation unit 14E acquires the first ambiguous scale depth information D1 pertaining to the reference time T1 (step S402). Furthermore, the scale conversion value calculation unit 14E acquires the first absolute scale position and posture information V1 and the second absolute scale position and posture information V2 (step S404).

Next, the scale conversion value calculation unit 14E calculates the ambiguous scale three dimensional flat surface R corresponding to a road surface region based on the first ambiguous scale depth information D1 derived from the first captured image 30A (step S406).

Then, the scale conversion value calculation unit 14E calculates the ambiguous scale installation height h representing an installation height of the imaging unit 22A in an ambiguous scale based on the ambiguous scale three dimensional flat surface R calculated at step S406 (step S408).

Next, the scale conversion value calculation unit 14E sets an initial value that has been set beforehand within a predetermined range to the absolute scale installation height hr, which represents a variable (step S410). For example, the scale conversion value calculation unit 14E regards a lower limit value of the predetermined range as the initial value to set the initial value to the absolute scale installation height hr. Note that, for the predetermined range used in the processing illustrated in FIG. 10, for example, a range of a value range representing a range of the ordinary vehicle height of the vehicle 1 is set.

Next, the scale conversion value calculation unit 14E calculates, as the scale conversion variable S', the ratio hr/h of the absolute scale installation height hr of the imaging unit 22A, which represents a variable, with respect to the set ambiguous scale installation height h (step S412).

Next, the scale conversion value calculation unit 14E uses the scale conversion variable S' calculated at step S142 to convert the first captured image 30A into the warping image 36 captured by the imaging unit 22A in the absolute scale position and posture represented by the second absolute scale position and posture information V2 pertaining to the target time T2 (step S414).

Then, the scale conversion value calculation unit 14E calculates a degree of coincidence between the coordinate points contained in the warping image 36 and coordinate points contained in the second captured image 30B, which lie at identical coordinates (step S416). The processing performed at step S416 is identical or similar to that at step S310 (see FIG. 9).

Then, the scale conversion value calculation unit 14E associates the degree of coincidence calculated at step S416 with the scale conversion variable S' used to calculate the degree of coincidence and causes the storage unit 12 to store the degree of coincidence and the variable (step S418).

Next, the scale conversion value calculation unit 14E determines whether changing of the absolute scale installation height hr within the predetermined range has been completed (step S420). For example, the scale conversion value calculation unit 14E determines whether changing of the absolute scale installation height hr within the predetermined range, expanding from the lower limit value to the upper limit value, has been completed. Specifically, for example, the scale conversion value calculation unit 14E may determine whether a value of the currently set absolute scale installation height hr has reached the upper limit value of the value range representing the range of the ordinary vehicle height of the vehicle 1 to perform the determination at step S420.

When there is a negative determination at step S420 (No at step S420), the flow proceeds to step S422. At step S422, a value obtained by adding a predetermined value β that has been set beforehand to the value of the currently set absolute scale installation height hr is set as a new value of the absolute scale installation height hr (step S422). For the predetermined value β, the value range representing the predetermined range described above may be divided into a plurality of subranges, and a value falling within each of the subranges may be set. Then, the flow returns to step S412 described above.

On the other hand, when there is a positive determination at step S420 (Yes at step S420), the flow proceeds to step S424. At step S424, the scale conversion value calculation unit 14E calculates, as the scale conversion value S, the scale conversion variable S' used to calculate the warping image 36 pertaining to the coordinate points maximizing a degree of coincidence (step S424). The scale conversion value calculation unit 14E may regard, as the scale conversion value S, the scale conversion variable S' indicating a value maximizing a degree of corresponding coincidence among the scale conversion variables S' stored in the storage unit 12.

Then, the scale conversion value calculation unit 14E ends the routine.

Next, an example of a flow of the scale conversion value calculation processing by using the searching method using a three dimensional position coordinate between the captured images 30 will now be described herein.

Figure 11:
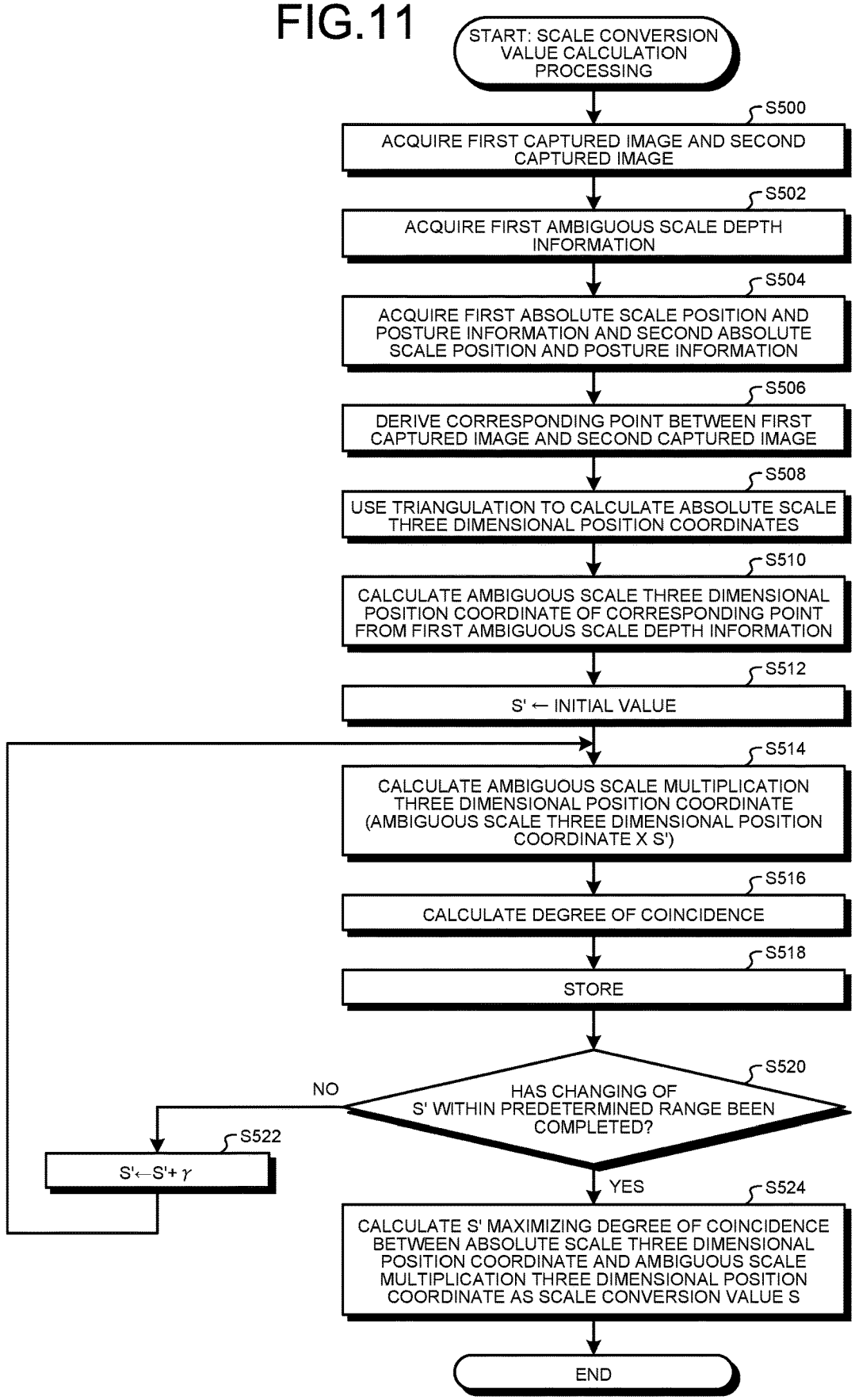
FIG. 11 is a flowchart of a flow of scale conversion value calculation processing by using a searching method using a three dimensional position coordinate between captured images.

FIG. 11 is a flowchart illustrating an example of a flow of the scale conversion value calculation processing by using the searching method using a three dimensional position coordinate between the captured images 30.

The scale conversion value calculation unit 14E performs processing at steps S500 to S504, similar to steps S200 to S204 (see FIG. 8).

Particularly, the scale conversion value calculation unit 14E acquires the first captured image 30A and the second captured image 30B (step S500). Furthermore, the scale conversion value calculation unit 14E acquires the first ambiguous scale depth information D1 pertaining to the reference time T1 (step S502). Furthermore, the scale conversion value calculation unit 14E acquires the first absolute scale position and posture information V1 and the second absolute scale position and posture information V2 (step S504).

Next, the scale conversion value calculation unit 14E derives the corresponding point P' forming a pair with the corresponding coordinate point P on the identical target object B between the first captured image 30A and the second captured image 30B (step S506).

The scale conversion value calculation unit 14E uses triangulation using the corresponding point P' formed from a pair of the coordinate point PA and the coordinate point PB, the first absolute scale position and posture information V1, and the second absolute scale position and posture information V2 to derive the absolute scale three dimensional position coordinate W representing a three dimensional position coordinate at an absolute scale point on the target object B in the actual space (step S508).

Next, the scale conversion value calculation unit 14E calculates, from the first ambiguous scale depth information D1 acquired at step S502, the ambiguous scale three dimensional position coordinate G of the corresponding point P' derived at step S506 (step S510).

Next, the scale conversion value calculation unit 14E sets an initial value that has been set beforehand within a predetermined range to the scale conversion variable S' (step S512). For example, the scale conversion value calculation unit 14E regards a lower limit value of the predetermined range as the initial value to set the initial value to the scale conversion variable S'. Note that, for the predetermined range used for the processing illustrated in FIG. 9, an identical range to the predetermined range used for the processing illustrated in FIGS. 8 and 9 may be used or a different range may be used.

Next, the scale conversion value calculation unit 14E uses the set scale conversion variable S' to calculate the ambiguous scale multiplication three dimensional position coordinate F (step S514). The scale conversion value calculation unit 14E multiplies the ambiguous scale three dimensional position coordinate G calculated at step S510 by the set scale conversion variable S' to calculate the ambiguous scale multiplication three dimensional position coordinate F.

Next, the scale conversion value calculation unit 14E calculates a degree of coincidence between the absolute scale three dimensional position coordinate W calculated at step S508 and the ambiguous scale multiplication three dimensional position coordinate F calculated at step 514 (step S516). The scale conversion value calculation unit 14E calculates a degree of coincidence indicating a value that increases as a difference in distance or a difference in depth between three dimensional coordinates, that is, between the absolute scale three dimensional position coordinate W and the ambiguous scale multiplication three dimensional position coordinate F decreases.

Then, the scale conversion value calculation unit 14E associates the degree of coincidence calculated at step S516 with the scale conversion variable S' used to calculate the degree of coincidence and causes the storage unit 12 to store the degree of coincidence and the variable (step S518).

Next, the scale conversion value calculation unit 14E determines whether changing of the scale conversion variable S' within the predetermined range has been completed (step S520). For example, the scale conversion value calculation unit 14E determines whether changing of the scale conversion variable S' within the predetermined range, expanding from the lower limit value to an upper limit value, has been completed. Specifically, for example, the scale conversion value calculation unit 14E may determine whether a value of the currently set scale conversion variable S' has reached the upper limit value of the predetermined range to perform the determination at step S520.

When there is a negative determination at step S520 (No at step S520), the flow proceeds to step S522. At step S522, a value obtained by adding a predetermined value γ that has been set beforehand to the value of the currently set scale conversion variable S' is set as a new value of the scale conversion variable S' (step S522). For the predetermined value γ, the predetermined range may be divided into a plurality of subranges, and a value falling within each of the subranges may be set. Then, the flow returns to step S514 described above.

On the other hand, when there is a positive determination at step S520 (Yes at step S520), the flow proceeds to step S524. At step S524, the scale conversion value calculation unit 14E calculates, as the scale conversion value S, the scale conversion variable S' used to calculate the ambiguous scale multiplication three dimensional position coordinate F maximizing a degree of coincidence (step S524). The scale conversion value calculation unit 14E may regard, as the scale conversion value S, the scale conversion variable S' indicating a value maximizing a degree of corresponding coincidence among the scale conversion variables S' stored in the storage unit 12. Then, the routine ends.

As described above, the absolute scale depth calculation device 10 according to the present embodiment includes the captured image acquisition unit 14A, the ambiguous scale depth deriving unit 14B, the position and posture acquisition unit 14C, and the absolute scale depth deriving unit 14D. The captured image acquisition unit 14A is configured to acquire the captured images 30 captured at different imaging time points from the imaging unit 22A mounted on the vehicle 1. The ambiguous scale depth deriving unit 14B is configured to derive the ambiguous scale depth information D from the captured images 30. The position and posture acquisition unit 14C is configured to acquire the absolute scale position and posture information V pertaining to the imaging unit 22A when each of the captured images 30 is captured. The absolute scale depth deriving unit 14D is configured to derive the absolute scale depth information Dr from the captured images 30, the ambiguous scale depth information D, and the absolute scale position and posture information V and based on the geometrical consistency.

Note in here that methods of calculating information of a depth to an object may include a known method of using observation information from a laser sensor or a radar sensor. However, there may be problems such as these sensors are expensive in unit price and, furthermore, their sensors are greater in size. Then, the method of using the captured images 30 captured by a small-sized camera that is not expensive has been disclosed.

For example, conventionally, there are known methods, such as a method based on Visual SLAM that simultaneously estimates three dimensional coordinates of positions, postures, and feature points between cameras from feature points and their correspondences in the captured images 30 and a method based on a neural network that directly estimates a depth image specified with the depths of points corresponding to pixel values by using the neural network. However, these methods are methods of acquiring depth information from images captured by a monocular camera. Therefore, it is not possible in principle to calculate depth information in the absolute scale from the monocular camera. It is therefore possible to only acquire, with these methods, a relative distance in an ambiguous scale.

Furthermore, it has been disclosed a technology of calculating absolute scale depth information by multiplying ambiguous scale depth information by a ratio between a camera installation height in an ambiguous scale and a camera installation height that has been actually measured beforehand. However, with this method, it has been difficult to derive absolute scale depth information in an environment where an actually measured value of a height of an installed camera is unknown or an environment where an actually measured value of a height of an installed camera fluctuates as the camera is mounted on a flying object, for example.

Furthermore, such a method has been disclosed that Visual SLAM and GNSS are combined with each other to convert positions and postures in an ambiguous scale between cameras into those in the absolute scale to use the values used for the conversion and the depth information in the ambiguous scale between the cameras in the identical scale to that of the positions and the postures, to acquire absolute scale depth information. However, this method is a method based on the premise that the positions and the postures in the ambiguous scale between the cameras and the depth in the ambiguous scale between the cameras are identical to each other in scale. However, there is a case where a method of acquiring a position and a posture and a method of acquiring a depth differ from each other, such as a position and a posture are acquired using GNSS/IMU or a wheel encoder, while a depth is estimated using a neural network. In conventional technologies, when a method of acquiring a position and a posture and a method of acquiring a depth differ from each other, it has been difficult to derive absolute scale depth information due to differences in scale between the position and posture and the depth.

That is, with such conventional technologies, there may be difficulties in deriving the absolute scale depth information Dr from the captured images 30.

On the other hand, in the absolute scale depth calculation device 10 according to the present embodiment, the absolute scale depth deriving unit 14D derives the absolute scale depth information Dr based on the geometrical consistency from the captured images 30 captured at different imaging time points, the ambiguous scale depth information D, and the absolute scale position and posture information V.

Therefore, with the absolute scale depth calculation device 10 according to the present embodiment, it is possible to make, into the absolute scale, the scale of the ambiguous scale depth image 32 specified with the ambiguous scale depth information D per pixel estimated from the captured images 30 captured by a monocular camera. Furthermore, the absolute scale depth calculation device 10 is able to calculate the absolute scale depth information Dr at high precision even in an environment where the absolute scale installation height hr of the imaging unit 22A is unknown or an environment where such an installation height fluctuates. Furthermore, the absolute scale depth calculation device 10 is able to calculate the absolute scale depth information Dr at high precision even when the scale of the position and posture of the imaging unit 22A and the scale of the depth differ from each other.

Therefore, the absolute scale depth calculation device 10 according to the present embodiment makes it possible to derive the absolute scale depth information Dr from the captured images 30.

Next, an example of a hardware configuration of the absolute scale depth calculation device 10 according to the present embodiment described above will now be described herein.

Figure 12:
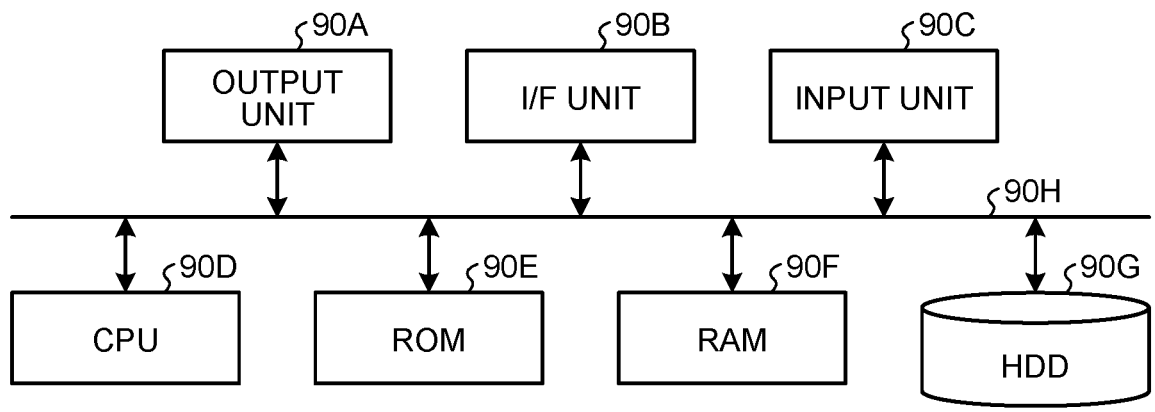
FIG. 12 is a hardware configuration diagram.

FIG. 12 is a hardware configuration diagram of an example of the absolute scale depth calculation device 10 according to the present embodiment described above.

The absolute scale depth calculation device 10 according to the present embodiment described above includes a control device such as a central processing unit (CPU) 90D, a storage device including, for example, a read only memory (ROM) 90E, a random access memory (RAM) 90F, and a hard disk drive (HDD) 90G, an I/F unit 90B serving as an interface to various devices, an output unit 90A configured to output various types of information such as output information, an input unit 90C configured to accept operations by a user, and a bus 90H configured to couple other components to each other, representing a hardware configuration using a standard computer.

In the absolute scale depth calculation device 10 according to the present embodiment described above, the CPU 90D reads computer programs from the ROM 90E onto the RAM 90F and executes the computer programs to achieve the components described above on the computer.

Note that the computer programs for executing the various types of processing as described above to be executed in the absolute scale depth calculation device 10 according to the present embodiment described above may be stored in the HDD 90G. Furthermore, the computer programs for executing the various types of processing as described above to be executed in the absolute scale depth calculation device 10 according to the present embodiment described above may be preliminary incorporated in and provided via the ROM 90E.

Furthermore, the computer programs for executing the various types of processing as described above to be executed in the absolute scale depth calculation device 10 according to the present embodiment described above may be stored in a computer readable storage medium such as CD-ROM, CD-R, memory card, digital versatile disc (DVD), or flexible disc (FD), in the form of installable or executable file, and may be provided as a computer program product. Furthermore, the computer programs for executing the various types of processing as described above to be executed in the absolute scale depth calculation device 10 according to the present embodiment described above may be stored in a computer coupled to a network such as the Interned and may be downloaded via the network for provision. Furthermore, the computer programs for executing the various types of processing as described above to be executed in the absolute scale depth calculation device 10 according to the present embodiment described above may be provided or distributed via a network such as the Internet.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An absolute scale depth calculation system comprising:
a camera mounted on a moving body and configured to capture a plurality of images at different imaging time points; and
processing circuitry configured to:
acquire the plurality of captured images from the camera;
derive ambiguous scale depth information from a captured image of the plurality of captured images;
acquire absolute scale position and posture information pertaining to the camera when each of the plurality of captured images is captured; and
derive absolute scale depth information, based on a geometrical consistency from the plurality of captured images, the ambiguous scale depth information, and the absolute scale position and posture information,
wherein, when deriving the absolute scale depth information, the processing circuitry is further configured to:
calculate a scale conversion value used to convert the ambiguous scale depth information into the absolute scale depth information, using the plurality of captured images, the ambiguous scale depth information, and the absolute scale position and posture information; and
calculate, as the absolute scale depth information, a multiplication result of multiplying the ambiguous scale depth information by the scale conversion value, and
wherein, when calculating the scale conversion value, the processing circuitry is further configured to:
from a first captured image captured at reference time and a second captured image captured at target time, the first captured image and the second captured image being included in the plurality of captured images,
from first ambiguous scale depth information representing the ambiguous scale depth information derived from the first captured image captured at the reference time, and
from first absolute scale position and posture information representing the absolute scale position and posture information pertaining to the camera at the reference time and second absolute scale position and posture information representing the absolute scale position and posture information pertaining to the camera at the target time,
based on a pair of coordinate points that are corresponding to each other between the first captured image and the second captured image,
change a scale conversion variable representing a variable by which the ambiguous scale depth information is to be multiplied, to calculate, as the scale conversion value, the scale conversion variable maximizing a geometrical consistency between the pair of coordinate points, and
use the first ambiguous scale depth information, the first absolute scale position and posture information, the second absolute scale position and posture information, and the scale conversion variable, to convert the first captured image into a warping image captured by the camera in an absolute scale position and posture represented by the second absolute scale position and posture information pertaining to the target time.

2. The absolute scale depth calculation system according to claim 1, wherein the processing circuitry is further configured to calculate, as the scale conversion value, the scale conversion variable maximizing a degree of coincidence between a first coordinate point and a second coordinate point, the first coordinate point representing a coordinate point on the first captured image, the second coordinate point representing a coordinate point on the second captured image onto which the first coordinate point is projected using the first ambiguous scale depth information, the first absolute scale position and posture information, the second absolute scale position and posture information, and the scale conversion variable, the coordinate point corresponding to the first coordinate point.

3. The absolute scale depth calculation system according to claim 1, wherein the processing circuitry is further configured to:
calculate, as the scale conversion value, the scale conversion variable maximizing a degree of coincidence between a coordinate point contained in the warping image and a coordinate point contained in the second captured image, the coordinate point contained in the second captured image lying at same coordinates as the coordinate point contained in the warping image.

4. The absolute scale depth calculation system according to claim 1, wherein the processing circuitry is further configured to:
derive absolute scale three dimensional position coordinates of an absolute scale point on a target object from a corresponding point representing a pair of coordinate points that are corresponding to each other on the identical target object between the first captured image and the second captured image, the first absolute scale position and posture information, and the second absolute scale position and posture information, the absolute scale point being indicated by the corresponding point through triangulation; and
calculate, as the scale conversion value, the scale conversion variable maximizing a degree of coincidence between an ambiguous scale multiplication three dimensional position coordinate and the absolute scale three dimensional position coordinate, the ambiguous scale multiplication three dimensional position coordinate being obtained by multiplying an ambiguous scale three dimensional position coordinate of the corresponding point by the scale conversion variable, the ambiguous scale three dimensional position coordinate being derived from the first ambiguous scale depth information.

5. The absolute scale depth calculation system according to claim 2, wherein the degree of coincidence indicates a value that increase as a difference in luminance, a difference in feature vector obtained from a feature amount descriptor, or a distance decreases.

6. The absolute scale depth calculation system according to claim 4, wherein the degree of coincidence indicates a value that increases as a difference in distance or a difference in depth between three dimensional coordinates decreases.

7. The absolute scale depth calculation system according to claim 2, wherein the scale conversion variable is represented by:
a variable taking any value that falls within a predetermined range,
a solution to a minimization problem where the degree of coincidence serves as an object function, or
a ratio of an absolute scale installation height of the camera with respect to an ambiguous scale installation height of the camera, the absolute scale installation height being a variable.

8. The absolute scale depth calculation system according to claim 1, wherein the processing circuitry is further configured to use the coordinate point within a region other than a moving body region contained in the captured image.

9. The absolute scale depth calculation system according to claim 1, wherein the processing circuitry is further configured to use, as the first captured image and the second captured image, two captured images between which an amount of movement of the camera between imaging time points is equal to or above a threshold value among the plurality of captured images.

10. The absolute scale depth calculation system according to claim 1, wherein the processing circuitry is further configured to acquire the absolute scale position and posture information from at least one of an external sensor and an internal sensor mounted on a vehicle.

11. The absolute scale depth calculation system according to claim 1, wherein the processing circuitry is further configured to use a geometrical technique using a neural network or simultaneous localization and mapping (SLAM), to derive the ambiguous scale depth information from the captured image.

12. An absolute scale depth calculation method comprising:
capturing, via a camera mounted on a moving body, a plurality of images at different imaging time points;
acquiring the plurality of captured images from the camera;
deriving ambiguous scale depth information from a captured image of the plurality of captured images;
acquiring absolute scale position and posture information pertaining to the camera when each of the plurality of captured images is captured; and
deriving absolute scale depth information, based on a geometrical consistency from the plurality of captured images, the ambiguous scale depth information, and the absolute scale position and posture information,
wherein the deriving the absolute scale depth information includes:
calculating a scale conversion value used to convert the ambiguous scale depth information into the absolute scale depth information, using the plurality of captured images, the ambiguous scale depth information, and the absolute scale position and posture information; and
calculating, as the absolute scale depth information, a multiplication result of multiplying the ambiguous scale depth information by the scale conversion value, and
wherein the calculating the scale conversion value includes:
from a first captured image captured at reference time and a second captured image captured at target time, the first captured image and the second captured image being included in the plurality of captured images,
from first ambiguous scale depth information representing the ambiguous scale depth information derived from the first captured image captured at the reference time, and
from first absolute scale position and posture information representing the absolute scale position and posture information pertaining to the camera at the reference time and second absolute scale position and posture information representing the absolute scale position and posture information pertaining to the camera at the target time,
based on a pair of coordinate points that are corresponding to each other between the first captured image and the second captured image, changing a scale conversion variable representing a variable by which the ambiguous scale depth information is to be multiplied, to calculate, as the scale conversion value, the scale conversion variable maximizing a geometrical consistency between the pair of coordinate points, and using the first ambiguous scale depth information, the first absolute scale position and posture information, the second absolute scale position and posture information, and the scale conversion variable, to convert the first captured image into a warping image captured by the camera in an absolute scale position and posture represented by the second absolute scale position and posture information pertaining to the target time.

13. The absolute scale depth calculation method according to claim 12, wherein the calculating the scale conversion value includes calculating, as the scale conversion value, the scale conversion variable maximizing a degree of coincidence between a first coordinate point and a second coordinate point, the first coordinate point representing a coordinate point on the first captured image, the second coordinate point representing a coordinate point on the second captured image onto which the first coordinate point is projected using the first ambiguous scale depth information, the first absolute scale position and posture information, the second absolute scale position and posture information, and the scale conversion variable, the coordinate point corresponding to the first coordinate point.

14. The absolute scale depth calculation method according to claim 12, wherein the calculating the scale conversion value includes:

calculating, as the scale conversion value, the scale conversion variable maximizing a degree of coincidence between a coordinate point contained in the warping image and a coordinate point contained in the second captured image, the coordinate point contained in the second captured image lying at same coordinates as the coordinate point contained in the warping image.

15. The absolute scale depth calculation method according to claim 12, wherein the calculating the scale conversion value includes:

deriving an absolute scale three dimensional position coordinate of an absolute scale point on a target object from a corresponding point representing a pair of coordinate points that are corresponding to each other on the identical target object between the first captured image and the second captured image, the first absolute scale position and posture information, and the second absolute scale position and posture information, the absolute scale point being indicated by the corresponding point through triangulation; and calculating, as the scale conversion value, the scale conversion variable maximizing a degree of coincidence between an ambiguous scale multiplication three dimensional position coordinate and the absolute scale three dimensional position coordinate, the ambiguous scale multiplication three dimensional position coordinate being obtained by multiplying an ambiguous scale three dimensional position coordinate of the corresponding point by the scale conversion variable, the ambiguous scale three dimensional position coordinate being derived from the first ambiguous scale depth information.

16. The absolute scale depth calculation method according to claim 13, wherein the degree of coincidence indicates a value that increase as a difference in luminance, a difference in feature vector obtained from a feature amount descriptor, or a distance decreases.

17. The absolute scale depth calculation method according to claim 15, wherein the degree of coincidence indicates a value that increases as a difference in distance or a difference in depth between three dimensional coordinates decreases.

18. The absolute scale depth calculation method according to claim 13, wherein the scale conversion variable is represented by:

a variable taking any value that falls within a predetermined range, a solution to a minimization problem where the degree of coincidence serves as an object function, or a ratio of an absolute scale installation height of the camera with respect to an ambiguous scale installation height of the camera, the absolute scale installation height being a variable.

19. The absolute scale depth calculation method according to claim 12, wherein the calculating the scale conversion value includes using the coordinate point within a region other than a moving body region contained in the captured image.

20. The absolute scale depth calculation method according to claim 12, wherein the calculating the scale conversion value includes using, as the first captured image and the second captured image, two captured images between which an amount of movement of the camera between imaging time points is equal to or above a threshold value among the plurality of captured images acquired at the acquiring the plurality of captured images.

21. A non-transitory computer-readable medium storing instructions that, when executed by one or more processors of a device, cause the device to:

capture, via a camera mounted on a moving body, a plurality of images at different imaging time points;

acquire the plurality of captured images from the camera;

derive ambiguous scale depth information from a captured image of the plurality of captured images;

acquire absolute scale position and posture information pertaining to the camera when each of the plurality of captured images is captured; and derive absolute scale depth information, based on a geometrical consistency from the plurality of captured images, the ambiguous scale depth information, and the absolute scale position and posture information, wherein, when deriving the absolute scale depth information, the instructions further cause the device to:

calculate a scale conversion value used to convert the ambiguous scale depth information into the absolute scale depth information, using the plurality of captured images, the ambiguous scale depth information, and the absolute scale position and posture information; and calculate, as the absolute scale depth information, a multiplication result of multiplying the ambiguous scale depth information by the scale conversion value, and wherein, when calculating the scale conversion value, the instructions further cause the device to:

from a first captured image captured at reference time and a second captured image captured at target time, the first captured image and the second captured image being included in the plurality of captured images, from first ambiguous scale depth information representing the ambiguous scale depth information derived from the first captured image captured at the reference time, and from first absolute scale position and posture information representing the absolute scale position and posture information pertaining to the camera at the reference time and second absolute scale position and posture information representing the absolute scale position and posture information pertaining to the camera at the target time, based on a pair of coordinate points that are corresponding to each other between the first captured image and the second captured image, change a scale conversion variable representing a variable by which the ambiguous scale depth information is to be multiplied, to calculate, as the scale conversion value, the scale conversion variable maximizing a geometrical consistency between the pair of coordinate points, and use the first ambiguous scale depth information, the first absolute scale position and posture information, the second absolute scale position and posture information, and the scale conversion variable, to convert the first captured image into a warping image captured by the camera in an absolute scale position and posture represented by the second absolute scale position and posture information pertaining to the target time.

* * * * *